United States Patent
Subramonian et al.

(10) Patent No.: US 6,720,363 B2
(45) Date of Patent: Apr. 13, 2004

(54) PREPARATION OF A MACROCELLULAR ACOUSTIC FOAM

(75) Inventors: Suresh Subramonian, Midland, MI (US); Sandrine Burgun, Drusenheim (FR); Chung P. Park, Baden-Baden (DE)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/782,499

(22) Filed: Feb. 13, 2001

(65) Prior Publication Data

US 2002/0006976 A1 Jan. 17, 2002

Related U.S. Application Data

(60) Provisional application No. 60/190,717, filed on Mar. 17, 2000.

(51) Int. Cl.$^7$ .................................................. C08J 9/00
(52) U.S. Cl. .............................. 521/81; 79/134; 79/139; 79/140
(58) Field of Search ................. 521/79, 81, 134, 521/139, 140

(56) References Cited

U.S. PATENT DOCUMENTS

| | | | |
|---|---|---|---|
| 3,188,295 A | 6/1965 | Ballast et al. | 260/2.5 |
| 4,277,569 A | 7/1981 | Walker | 521/92 |
| 4,323,528 A * | 4/1982 | Collins | |
| 5,460,818 A | 10/1995 | Park et al. | 426/415 |
| 5,475,035 A | 12/1995 | Park et al. | 521/79 |
| 5,585,058 A | 12/1996 | Kolosowski | 264/156 |
| 5,703,187 A | 12/1997 | Timmers | 526/282 |
| 5,874,024 A | 2/1999 | Knaus | 252/356 |
| 5,904,970 A | 5/1999 | Lauer et al. | 428/71 |
| 5,911,940 A | 6/1999 | Walton et al. | 264/415 |
| 5,993,707 A | 11/1999 | Chaudhary et al. | 264/53 |
| 6,187,232 B1 * | 2/2001 | Chaudhary et al. | |
| 6,369,120 B1 * | 4/2002 | Chaudhary et al. | |
| 6,417,240 B1 | 7/2002 | Park | 521/59 |

FOREIGN PATENT DOCUMENTS

| | | | |
|---|---|---|---|
| EP | 262249 B1 | 8/1993 | C08J/9/14 |
| JP | 61-176637 | 8/1986 | C08J/9/04 |
| JP | 05-320399 | 12/1993 | C08J/9/04 |
| WO | WO 90/07407 | 7/1990 | B29B/7/30 |
| WO | WO 98/10015 | 3/1998 | C08L/23/02 |
| WO | WO 98/37131 | 8/1998 | C08L/9/02 |
| WO | WO 98/46678 | 10/1998 | C08L/23/10 |
| WO | WO 99/67322 | 12/1999 | C08J/9/12 |
| WO | WO 00/02800 | 1/2000 | B65D/90/06 |
| WO | WO 00/15697 | 3/2000 | C08J/9/00 |
| WO | WO 00/15700 | 3/2000 | C08J/9/00 |

* cited by examiner

*Primary Examiner*—Morton Foelak

(57) ABSTRACT

A process for making a macrocellular acoustic foam is disclosed in which a foamable gel made of a blowing agent and a polymeric resin composition is subjected to an extrusion process at a die pressure greater than the prefoaming critical die pressure but less than or equal to four times that of said prefoaming critical die pressure and macrocellular foams obtainable by that process are also disclosed which are made of:

A) one or more homopolymers of ethylene, one or more $C_3$–$C_{20}$ α-olefin polymers, or a combination thereof;

B) one or more halogenated flame retardants;

C) optionally, one or more polymers other than that of Component A; and

D) optionally, one or more flame retardant synergists.

19 Claims, No Drawings

PREPARATION OF A MACROCELLULAR ACOUSTIC FOAM

CROSS-REFERENCE TO RELATED APPLICATIONS

This application claims priority from U.S. Provisional Application No. 60/190,717 filed on Mar. 17, 2000.

BACKGROUND OF THE INVENTION

Foams and foamed articles often find utility in acoustic systems for sound absorption and insulation. Such foams, when developed for different market segments (appliance, automotive, building & construction, etc) often need to meet certain acoustic performance requirements and applicable fire test codes. To achieve the desired fire rating, a variety of flame retardants are often added to such foam resin formulations. Unfortunately, the typical flame retardants and other additives added to the formulation cause a number of foam problems. Flame retardants cause poor cell structure and cell collapse due to their effects on the polymer gel viscosity and melt strength. Flame retardants also act as nucleating agents in the foaming process and provide additional nucleation sites, resulting in the formation of a large number of small cells with variable properties. Unfortunately, small cell foam is not as acoustically active as large cell foam for sound absorption.

U.S. Pat. No. 4,277,569 teaches the preparation of flame retardant polyolefin foams for thermal insulation and padding. However, the patent does not describe macrocellular foams or flame retardant macrocellular foams for acoustic applications or their preparation.

Copending U.S. application Ser. No. 60/178,516 filed on Jan. 19, 2000 in the name of Martin Reimers et al., teaches the composition of macrocellular foams useful in sound management and a process to make the same. Copending U.S. application Ser. No. 60/168844 filed on Dec. 3, 1999 in the name of Bharat Chaudhary et al., teaches the use of flame retardants and synergists in the preparation of fabricated articles from substantially random ethylene styrene interpolymers and blends.

However, a significant market need still exists for a large cell, acoustically active foam with good flame retardancy. This disclosure teaches a composition and a method of preparation of such macrocellular acoustic foam having both good flame retardancy and acoustic properties, suitable for several commercial applications. The key to the invention is the selection of a low nucleating foam composition, combining it with a selected flame retardant and extruding the formulation at a specific die pressure. The formulations are based on one or more ethylene or α-olefin homopolymer resins or their blends. The formulation optionally includes, a second polymer component, cell-enlarging agents, and organic or inorganic flame retardant synergists.

BRIEF SUMMARY OF THE INVENTION

One aspect of the present invention is macrocellular acoustic foam comprising:

A) one or more homopolymers of ethylene, one or more $C_3$–$C_{20}$ α-olefin polymers, or a combination thereof;

B) one or more halogenated flame retardants;

C) optionally, one or more polymers other than that of Component A; and

D) optionally, one or more flame retardant synergists.

Another aspect of the present invention is a process for making macrocellular acoustic foam, such as those described below, comprising subjecting a foamable gel comprising at least one blowing agent and at least one polymeric resin composition to a die pressure greater than the prefoaming critical die pressure but less than or equal to four times that of said prefoaming critical die pressure.

Another aspect of this invention is macrocellular acoustic foams obtainable, or prepared, by the above process of this invention, particularly those comprising;

A) one or more homopolymers of ethylene, one or more $C_3$–$C_{20}$ α-olefin polymers, or a combination thereof;

B) one or more halogenated flame retardants;

C) optionally, one or more polymers other than that of Component A; and

D) optionally, one or more flame retardant synergists, as such or preferably in the form of an office partition, automotive decoupler, domestic appliance sound insulation, sound proofing panel or machine enclosure.

Another aspect of this invention is the method of using the above macrocellular acoustic foam as an acoustic absorption or acoustic insulation material, particularly in environments in which fire retardancy is required.

DETAILED DESCRIPTION OF THE INVENTION

Definitions

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The term "flame retardant" is used herein to indicate a flame retardant which can be any halogen-containing compound or mixture of compounds which imparts flame resistance to the compositions of the present invention.

The term "flame retardant synergist" is used herein to indicate inorganic or organic compounds which enhance the effectiveness of flame-retardants, especially halogenated flame retardants.

The term "interpolymer" is used herein to indicate a polymer wherein at least two different monomers are polymerized to make the interpolymer. This includes copolymers, terpolymers, etc.

The term "macrocellular acoustic foam" is used herein to indicate a foam having an average cell size according to ASTM D3576 of from about 1.5 mm to about 15 mm, with cell sizes of from about 2 mm to about 10 mm being preferred, from about 3 mm to about 10 mm being more preferred, and from about 4 mm to about 8 mm being particularly preferred, and which, at a thickness of 35 mm, has an average sound absorption coefficient (measured via ASTM E-1050 at 250, 500, 1000 and 2000 Hz) of greater than about 0.15, preferably greater than about 0.20, more preferably greater than about 0.25, even more preferably greater than about 0.30.

The term "prefoaming critical die pressure" is best determined empirically by observation of the foaming process, and is defined herein as the minimum die pressure at which popping is heard at the die and the resulting foam takes on a rough surface caused by premature nucleation and expansion of the foam inside the die lip.

Preparation of Foams

Excellent teachings to processes for making ethylenic polymer foam structures and processing them can be found in C. P. Park. "Polyolefin Foam", Chapter 9, Handbook of Polymer Foams and Technology, edited by D. Klempner and K. C. Frisch, Hanser Publishers, Munich, Vienna, New York, Barcelona (1991), which is incorporated here in by reference.

The present process for making the macrocellular foam involves for the most part a conventional extrusion foaming process. The foam is advantageously prepared by heating an ethylenic polymer material to form a plasticized or melt polymer material, incorporating therein a blowing agent to form a foamable gel, and extruding the gel through a die to form the foam product. Prior to mixing with the blowing agent, the polymer material is heated to a temperature at or above its glass transition temperature or melting point. The blowing agent is optionally incorporated or mixed into the melt polymer material by any means known in the art such as with an extruder, mixer, blender, or the like. The blowing agent is mixed with the melt polymer material at an elevated pressure sufficient to prevent substantial expansion of the melt polymer material and to advantageously disperse the blowing agent homogeneously therein. Optionally, a nucleator is optionally blended in the polymer melt or dry blended with the polymer material prior to plasticizing or melting. The foamable gel is typically cooled to a lower temperature to optimize physical characteristics of the foam structure. The gel is then extruded or conveyed through a die of desired shape to a zone of reduced or lower pressure to form the foam structure. The zone of lower pressure is at a pressure lower than that in which the foamable gel is maintained prior to extrusion through the die. The lower pressure is optionally superatmospheric or subatmospheric (vacuum), but is preferably at an atmospheric level.

However, what is critical to the process of the present invention is that the preparation of the macrocellular foam involves using a low die pressure for extrusion which is greater than the prefoaming critical die pressure but can only go as high as four times, more preferably three times, even more preferably two times the prefoaming critical die pressure.

The range of the prefoaming critical die pressure can be estimated from a calculation based on solubility data for the blowing agent in the polymer melt as a function of temperature and pressure. For interpolation or extrapolation, the Flory-Huggins equation or the Eyring and Henry equations can be used. The Flory Huggins theory provides an implicit relationship for solubility as a function of temperature and pressure and requires a trial and error solution procedure.

The Eyring equation and Henry equation provide an explicit relationship for solubility as a function of temperature and pressure that is easier to implement. The solubility of isobutane (and other blowing agents) in low density polyethylene as a function of temperature and pressure has been experimentally determined by B. I. Chaudhary & A. I. Johns and reported in Journal of Cellular Plastics, volume 34, number 4, pages 312–328 (1998). Experimental data is presented at three temperatures: 145° C., 160° C., and 200° C. Using the equations described below, the solubility curve at 108° C. (foaming temperature) is predicted and the pressure corresponding to the solubility at 9% (weight), i.e. 90 mg/g polymer is read off as the prefoaming critical die pressure.

At constant pressure, the Eyring equation is given by $$S = So^* \exp(-\Delta H/RT)$$

where S is the solubility of the gas at temperature, So is the solubility at the reference condition, $\Delta H$ is enthalpy and T is temperature, in K.

At constant temperature, the Henry equation is given by $$p = K^*S$$

where p is the partial pressure of the gas, K is a constant and S is the solubility.

At a fixed pressure, the solubility of the gas in the melt at any temperature is calculated from the solubilities at the two experimental temperatures. Thus, the solubility at 108° C. (foaming temperature) and say 40 bar can be calculated from the solubility's at say 145° C. and 160° C. at 40 bar, using the Eyring equation.

Knowing the solubility at 108° C. and say 40 bar, the Henry equation can be used to calculate the pressure corresponding to the 9% by weight isobutane solubility in polyethylene. This is the minimum pressure to keep the isobutane solubilized in the polymer melt and is therefore the prefoaming critical die pressure.

Due to scatter in the experimental data, extrapolation to 108° C. resulted in varying values for the prefoaming critical die pressure, depending on the data points chosen. Thus the prefoaming critical die pressure obtained by extrapolation of the experimental data is therefore not reliable. Thus, it is recommended that the experimental procedure cited in the reference be used to generate the solubility curve at 108° C. and the pressure corresponding to the solubility of 9 pph isobutane be determined directly without extrapolation to obtain the prefoaming critical die pressure.

The prefoaming critical die pressure is best determined experimentally for formulations comprising not only the polymer components but also additional additives such as flame retardants, synergists and cell enlarging agents. This is typically accomplished by preparing foams at several prefoaming die pressures and determining the effect of changes in the die pressure on the foam cell size and appearance. Below the prefoaming critical die pressure, the quality of the foam deteriorates sharply, rough skin is observed on the foam due to rupture of surface cells and typically a crackling noise is heard at the die due to rapid degassing of the blowing agent. At too high die pressures, the foam tends to nucleate significantly causing a loss in cell size upper limit which typically corresponds to a value of up to four times, the prefoaming critical die pressure.

In another embodiment of the present invention, the resulting foam structure is optionally formed in a coalesced strand form by extrusion of the ethylenic polymer material through a multi-orifice die and wherein the die pressure for extrusion is greater than the prefoaming critical die pressure but can only go as high as four times, preferably three times, more preferably two times the prefoaming critical die pressure. The orifices are arranged so that contact between adjacent streams of the molten extrudate occurs during the foaming process and the contacting surfaces adhere to one another with sufficient adhesion to result in a unitary foam structure. The streams of molten extrudate exiting the die take the form of strands or profiles, which desirably foam, coalesce, and adhere to one another to form a unitary structure. Desirably, the coalesced individual strands or profiles should remain adhered in a unitary structure to prevent strand delamination under stresses encountered in preparing, shaping, and using the foam. Apparatuses and method for producing foam structures in coalesced strand form are seen in U.S. Pat. Nos. 3,573,152 and 4,824,720, both of which are incorporated herein by reference.

Alternatively, the resulting foam structure is conveniently formed by an accumulating extrusion process as seen in U.S.

Pat. No. 4,323,528, which is incorporated by reference herein. In this process, low density foam structures having large lateral cross-sectional areas are prepared by: 1) forming under pressure a gel of the ethylenic polymer material and a blowing agent at a temperature at which the viscosity of the gel is sufficient to retain the blowing agent when the gel is allowed to expand; 2) extruding the gel into a holding zone maintained at a temperature and pressure which does not allow the gel to foam, the holding zone having an outlet die defining an orifice opening into a zone of lower pressure at which the gel foams, and an openable gate closing the die orifice; 3) periodically opening the gate; 4) substantially concurrently applying mechanical pressure by a movable ram on the gel to eject it from the holding zone through the die orifice into the zone of lower pressure, at a rate greater than that at which substantial foaming in the die orifice occurs and less than that at which substantial irregularities in cross-sectional area or shape occurs; and 5) permitting the ejected gel to expand unrestrained in at least one dimension to produce the foam structure, and 6) wherein the die pressure for extrusion is greater than the prefoaming critical die pressure where prefoaming occurs but can only go as high as four times, more preferably three times, even more preferably two times the prefoaming critical die pressure.

Blowing agents useful in making the resulting foam structure include inorganic agents, organic blowing agents and chemical blowing agents. Suitable inorganic blowing agents include carbon dioxide, nitrogen, argon, water, air, nitrogen, and helium. Organic blowing agents include aliphatic hydrocarbons having 1–6 carbon atoms, aliphatic alcohols having 1–3 carbon atoms, and fully and partially halogenated aliphatic hydrocarbons having 1–4 carbon atoms. Aliphatic hydrocarbons include methane, ethane, propane, n-butane, isobutane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroethane (HFC-143a), 1,1,1,-2-tetrafluoro-ethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1 fluoroethane (HCFC-141b), 1-chloro 1,1-difluoroethane (HCFC-142b), 1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichloro-hexafluoropropane. Chemical blowing agents include azodicarboicarbonamide, azodiisobutyronitrile, barium azodicarboxylate, n,n'-dimethyl-n,n'-dinitrosoterephthalamide, and benzenesulfonhydrazide, 4,4-oxybenzene sulfonyl semicarbazide, and p-toluene sulfonyl semicarbazide trihydrazino triazine. Preferred blowing agents include propane, n-butane, isobutane, HCFC-142b, HFC-152a, carbon dioxide and mixtures of the foregoing.

The amount of blowing agent incorporated into the polymer melt material to make a foam-forming polymer gel is typically from about 0.2 to about 5.0, preferably from about 0.5 to about 3.0, and most preferably from about 1.0 to 2.50 gram moles per kilogram of polymer. However, these ranges should not be taken to limit the scope of the present invention.

The foam of this invention preferably has perforation channels, more preferably a multiplicity of perforation channels extending from the at least one surface into the foam such that there is an average of at least one, preferably at least 5, more preferably at least 10, even more preferably at least 20, and even more preferably at least 30, perforation channel(s) per 10 square centimeters ($cm^2$) area of the at least one surface. The term "multiplicity" as used herein means at least two. In a preferred embodiment, the foam of this invention contains at least seven perforation channels.

The perforation channels preferably have an average diameter at the at least one surface of at least about 0.1 mm, more preferably at least about 0.5 mm, and even more preferably at least about 1 mm and preferably up to about the average cell size of the foam measured according to ASTM D 3756. One or more surfaces of the foam preferably has an average of at least four perforation channels per square centimeter extending from the at least one surface into the foam.

The polymer foam preferably has an average thickness perpendicular to the surface perforated of at least about 25 mm and the polymer foam is preferably perforated to an average depth of at least 5 mm below the surface of the polymer foam.

Typically, perforation comprises puncturing the base foam with one or more pointed, sharp objects. Suitable pointed, sharp objects include needles, spikes, pins, or nails. In addition, perforation may comprise drilling, laser cutting, high pressure fluid cutting, air guns, or projectiles. A description of how to create suitable perforation channels for a different purpose, namely to accelerate release of blowing agent from the foam, is provided in U.S. Pat. No. 5,585,058, which is incorporated herein by reference.

In addition, the base foam may be prepared to have elongated cells by pulling the foam during expansion. Such pulling results in elongated cells without changing or often, increasing the cell size in the horizontal direction. Thus, pulling results in an increased average cell size in the direction perpendicular to the vertical direction (EH average) and facilitates perforation.

Perforation of the base foam may be performed in any pattern, including square patterns and triangular patterns. Although the choice of a particular diameter of the sharp, pointed object with which to perforate the base foam is dependent upon many factors, including average cell size, intended spacing of perforations, pointed, sharp objects useful in the preparation of certain foams of the present invention will typically have diameters of from 1 mm to 4 mm.

Compression may be used as an additional means of opening cells. Compression may be performed by any means sufficient to exert external force to one or more surfaces of the foam, and thus cause the cells within the foam to burst. Compression during or after perforation is especially effective in rupturing the cell walls adjacent to the channels created by perforation since a high pressure difference across the cell walls can be created. In addition, unlike needle punching, compression can result in rupturing cell walls facing in all directions, thereby creating tortuous paths desired for sound absorption.

The mechanical opening of closed-cells of the base foam lowers the airflow resistivity of the base foam by creating large-size pores in the cell walls and struts. In any event, regardless of the particular means by which it does so, such mechanical opening of closed-cells within the base thermoplastic polymer foam serves to enhance the usefulness of the foam for sound absorption and sound insulation applications.

Of course, the percentage of cells opened mechanically will depend on a number of factors, including cell size, cell shape, means for opening, and the extent of the application of the means for opening applied to the base foam.

The resulting foam structure preferably exhibits good dimensional stability. Preferred foams recover 80 or more percent of initial volume within a month with initial volume being measured within 30 seconds after foam expansion. Volume is measured by a suitable method such as cubic displacement of water.

In addition, a nucleating agent may optionally be added in order to control the size of foam cells. Preferred nucleating agents include inorganic substances such as calcium carbonate, talc, clay, titanium oxide, silica, barium sulfate, diatomaceous earth, mixtures of citric acid and sodium bicarbonate, and the like. The amount of nucleating agent employed may range from 0 to about 5 parts by weight per hundred parts by weight of a polymer resin.

The resulting foam structure may be substantially non-crosslinked or uncrosslinked. The polymer material comprising the foam structure is substantially free of crosslinking.

The foam structure may also be substantially cross-linked. Cross-linking may be induced by addition of a cross-linking agent or by radiation. Induction of cross-linking and exposure to an elevated temperature to effect foaming or expansion may occur simultaneously or sequentially. If a cross-linking agent is used, it is incorporated into the polymer material in the same manner as the chemical blowing agent. Further, if a cross-linking agent is used, the foamable melt polymer material is heated or exposed to a temperature of preferably less than 150° C. to prevent decomposition of the cross-linking agent or the blowing agent and to prevent premature cross-linking. If radiation cross-linking is used, the foamable melt polymer material is heated or exposed to a temperature of preferably less than 160° C. to prevent decomposition of the blowing agent. The foamable melt polymer material is extruded or conveyed through a die of desired shape to form a foamable structure. The foamable structure is then cross-linked and expanded at an elevated or high temperature (typically, 150° C.–250° C.) such as in an oven to form a foam structure. If radiation cross-linking is used, the foamable structure is irradiated to cross-link the polymer material, which is then expanded at the elevated temperature as described above. The present structure can advantageously be made in sheet or thin plank form according to the above process using either cross-linking agents or radiation.

The present foam structure may also be made into a continuous plank structure by an extrusion process utilizing a long-land die as described in GB 2,145,961A. In that process, the polymer, decomposable blowing agent and cross-linking agent are mixed in an extruder, heating the mixture to let the polymer cross-link and the blowing agent to decompose in a long-land die; and shaping and conducting away from the foam structure through the die with the foam structure and the die contact lubricated by a proper lubrication material.

The resulting foam structure may be either closed-celled or open-celled. The open cell content will range from 0 to 100 volume % as measured according to ASTM D2856-A.

The resulting foam structure preferably has a density of less than 300, preferably less than 100, more preferably less than 60 and most preferably from about 10 to about 50 kilograms per cubic meter.

The macrocellular foams exhibit an average cell size of from about 1.5 mm to about 15 mm, with cell sizes of from about 2 mm to about 10 mm being preferred, from about 3 mm to about 10 mm being more preferred, and from about 4 mm to about 8 mm being particularly preferred, according to ASTM D3576. The preferred ranges of density and cell size should not be taken as limiting the scope of this invention.

The macrocellular foams made by the process of the present invention can be prepared from any combination of polymers for which the prefoaming critical die pressure can be determined. Preferably the resin to be foamed comprises an ethylene or α-olefin homopolymer resin or a blend of one or more of said ethylene or α-olefin homopolymers. The resin to be foamed can also comprise a blend of one or more of said ethylene or α-olefin homopolymers with a second polymer component. This second polymer component can include, but is not limited to, ethylene/alpha olefin interpolymers (including polyolefin elastomers, and polyolefin plastomers) or one or more substantially random interpolymers, or combinations thereof.

The α-Olefin Homopolymer

The homopolymer resins include polyethylene or $C_3$–$C_{20}$ α-olefin homopolymers or combinations thereof, preferably polyethylene or $C_3$–$C_{10}$ α-olefin homopolymers or combinations thereof, most preferably interpolymers comprising polyethylene or propylene polymers, or combinations thereof. One such class of polyethylene resins is generally produced by a high pressure polymerization process using a free radical initiator resulting in the traditional long chain branched low density polyethylene (LDPE). LDPE employed in the present composition usually has a density of less than or equal to about 0.935 g/cc (ASTM D 792) and a melt index of from about 0.01 to about 100, and preferably from about 0.05 to about 50, more preferably from about 0.1 to about 20 grams per 10 minutes (as determined by ASTM Test Method D 1238, Condition 190°/2.16).

The term "propylene polymer" as used herein means a polymer in which at least 50 weight percent of its monomeric units are derived directly from propylene. Suitable ethylenically unsaturated monomers other than propylene that may be included in the propylene polymer, include olefins, vinylacetate, methylacrylate, ethylacrylate, methyl methacrylate, acrylic acid, itaconic acid, maleic acid, and maleic anhydride. Appropriate propylene interpolymers include random, block, and grafted copolymers or interpolymers of propylene and an olefin selected from the group consisting of ethylene, $C_4$–$C_{10}$ 1-olefins, and $C_4$–$C_{10}$ dienes. Propylene interpolymers also include random terpolymers of propylene and 1-olefins selected from the group consisting of ethylene and $C_4$–$C_8$ 1-olefins. The $C_4$–$C_{10}$ 1-olefins include the linear and branched $C_4$–$C_{10}$ 1-olefins such as, for example, 1-butene, isobutylene, 1-pentene, 3-methyl-1-butene, 1-hexene, 3,4-dimethyl-1-butene, 1-heptene, 3-methyl-1-hexene, and the like. Examples of $C_4$–$C_{10}$ dienes include 1,3-butadiene, 1,4-pentadiene, isoprene, 1,5-hexadiene, and 2,3-dimethyl-1,3-hexadiene. As used herein, the term "interpolymers" means polymers derived from the reaction of two of more different monomers and includes, for example, copolymers and terpolymers.

The propylene polymer material may be comprised solely of one or more propylene homopolymers, one or more propylene copolymers, and blends of one or more of each of propylene homopolymers and copolymers. The polypropylene preferably comprises at least about 70, even more preferably at least about 90, and even more preferably about 100, weight percent propylene monomer derived units (i.e., the propylene homopolymers are preferred).

The propylene polymer preferably has a weight average molecular weight ($M_w$) of at least 100,000. $M_w$ can be measured by known procedures.

The propylene polymer also preferably has a branching index less than 1. The branching index is an approach to quantifying the degree of long chain branching selected for this particular invention. The definition of branching index and procedure for determining the same is described in column 3, line 65 to column 4, line 30, of U.S. Pat. No. 4,916,198, which is incorporated herein by reference. The branching index is more preferably less than about 0.9, and even more preferably less than about 0.4.

The propylene polymer has a tan δ value not greater than 1.5, preferably not greater than 1.2, even more preferably not greater than 1.0, and even more preferably not greater than 0.8. Tan δ may be calculated from g"/g', where g" is the loss modulus of the propylene polymer and g' is storage modulus of the propylene polymer melt using a 2.5 mm thick and 25 mm diameter specimen of the propylene polymer at 190 C. at a one Radian per second oscillating frequency. These parameters may be measured using a mechanical spectrometer, such as a Rheometrics Model RMS-800 available from Rheometrics, Inc., Piscataway, N.J., U.S.A. Further details of how to carry out this determination of the tan δ, g' and g" values is provided in column 5, lines 59 to 64, and column 6, lines 4 to 29, of U.S. Pat. No. 5,527,573, which is incorporated herein by reference.

In addition or in the alternative, the propylene polymer preferably has a melt tension of at least about 7 centiNewtons (cN), more preferably at least about 10 cN, and even more preferably at least about 15 cN, and even more preferably at least about 20 cN. Preferably, the propylene polymer has a melt tension not greater than about 60 cN, more preferably not greater than about 40 cN. The term "melt tension" as used throughout this description refers to a measurement of the tension in cN of a strand of molten polymer material at extruded from a capillary die with an diameter of 2.1 mm and a length of 40 mm at 230° C. at an extrusion speed of 20 mm/minute (min.) and a constant take-up speed of 3.14 meter/minute using an apparatus known as a Melt Tension Tester Model 2 available from Toyo Seiki Seisaku-sho, Ltd. This method for determining melt tension is sometimes referred to as the "Chisso method".

In addition or in the alternative, the propylene polymer preferably has a melt strength of at least about 10 centiNewtons (cN), more preferably at least about 20 cN, and even more preferably at least about 25 cN, and even more preferably at least about 30 cN. Preferably, the propylene polymer has a melt strength not greater than about 60 cN, more preferably not greater than about 55 cN. The term "melt strength" throughout this description refers to a measurement of the tension in cN of a strand of molten polymer material extruded from a capillary die with an diameter of 2.1 mm and a length of 41.9 mm at 190° C. at a rate of 0.030 cc/sec. and stretched at a constant acceleration to determine the limiting draw force, or strength at break, using an apparatus known as a Gottfert Rheotens™ melt tension apparatus available from Gottfert, Inc.

The propylene polymer used in the process of the invention preferably also has a melt elongation of at least 100 percent, more preferably at least 150 percent, most preferably at least 200 percent as measured by the same Rheotens™ melt tension apparatus and general procedure described above.

The propylene polymer material preferably also has a melt flow rate of at least about 0.01 more preferably at least about 0.05, even more preferably at least about 0.1 g/10 min., and even more preferably at least about 0.5 g/10 min. up to about 100, more preferably up to about 50, even more preferably up to about 20, and even more preferably up to about 10, g/10 min. Throughout this description, the term "melt flow rate" refers to a measurement conducted according to American Society for Testing and Materials (ASTM) D-1238 condition 230° C./2.16 kg. (aka Condition L).

Preferred propylene polymers include those that are branched or lightly cross-linked. Branching (or light cross-linking) may be obtained by those methods generally known in the art, such as chemical or irradiation branching/light cross-linking. One such resin which is prepared as a branched/lightly cross-linked polypropylene resin prior to using the polypropylene resin to prepare a finished polypropylene resin product and the method of preparing such a polypropylene resin is described in U.S. Pat. No. 4,916,198, which is hereby incorporated by reference. Another method to prepare branched/lightly cross-linked polypropylene resin is to introduce chemical compounds into the extruder, along with a polypropylene resin and allow the branching/lightly cross-linking reaction to take place in the extruder. This method is illustrated in U.S. Pat. No. 3,250,731 with a polyfunctional azide, U.S. Pat. No. 4,714,716 (and published International Application WO 99/10424) with an azidofunctional silane and EP 879,844-A1 with a peroxide in conjunction with a multi-vinyl functional monomer. The aforementioned U.S. patents are incorporated herein by reference. Irradiation techniques are illustrated by U.S. Pat. Nos. 5,605,936 and 5,883,151, which are also incorporated by reference. The polymer composition used to prepare the foam preferably has a gel content of less than 10 percent, more preferably less than 5 percent, per ASTM D2765-84, Method A.

If the ethylene homopolymer is blended with the propylene polymer, the weight ratio of the propylene polymer to the ethylene homopolymer is at least about 35:65.

The Second Polymer Blend Component

In addition to the olefin homopolymer component, the polymer compositions used to prepare the foams of the present invention optionally can also comprise a second polymer component, which must be foamable in its unblended state, and must also, when blended with the olefin homopolymer component, yield a macrocellular acoustic foam. The olefin homopolymer or blend component is typically the majority component of a blend with a second polymer blend component, although this depends on their relative melting points and/or Tg's. In any such blend, it is critical that the component having the highest melting point or Tg be present in an amount greater than 35 wt %, preferably greater than about 40 wt %, more preferably greater than about 50 wt % in the final blend.

This second polymer component can comprise one or more of; heterogeneous ethylene/α-olefin interpolymers, preferably a heterogeneous ethylene/$C_3$–$C_8$ α-olefin interpolymer, most preferably a heterogeneous ethylene/octene-1 interpolymer; or homogeneous ethylene/α-olefin interpolymers, including the substantially linear ethylene/α-olefin interpolymers, most preferably a substantially linear ethylene/$C_3$–$C_8$ α-olefin interpolymer; or a substantially random interpolymer, preferably a substantially random ethylene/styrene interpolymer; or a thermoplastic olefin, preferably an ethylene/propylene rubber (EPM) or ethylene/propylene diene monomer terpolymer (EPDM); or a styrenic block copolymer, preferably styrene-butadiene (SB), styrene-isoprene(SI), styrene-butadiene-styrene (SBS), styrene-isoprene-styrene (SIS) or styrene-ethylene/butene-styrene (SEBS) block copolymer, most preferably a styrene-butadiene-styrene (SBS) copolymer; or styrenic homopolymers or copolymers, preferably polystyrene, high impact polystyrene, copolymers of styrene and at least one of acrylonitrile, methacrylonitrile, maleic anhydride, or α-methyl styrene, most preferably polystyrene; or elastomers, preferably polyisoprene, polybutadiene, natural rubbers, ethylene/propylene rubbers, ethylene/propylene diene (EPDM) rubbers, styrene/butadiene rubbers, thermoplastic polyurethanes; or vinyl halide homopolymers and copolymers, preferably homopolymers or copolymers of vinyl chloride or vinylidene chloride or the chlorinated derivatives therefrom, most preferably poly(vinyl chloride) and poly(vinylidene chloride); or engineering thermoplastics, preferably poly(methylmethacrylate) (PMMA), cellulosics, nylons, poly(esters), poly(acetals); poly(amides),the poly(acrylate), aromatic polyesters, poly(carbonate), poly(butylene) and polybutylene and polyethylene terephthalates, most preferably poly(methylmethacrylate) (PMMA), and poly(esters); and any and all combinations thereof.

The ethylene/α-olefin interpolymers can be further characterized by their degree of long or short chain branching and the distribution thereof. Linear olefin polymers which have an absence of long chain branching, such as the traditional linear low density polyethylene polymers (heterogeneous LLDPE) or linear high density polyethylene polymers (HDPE) made using Ziegler polymerization processes (for example, U.S. Pat. No. 4,076,698 (Anderson et al.), are sometimes called heterogeneous polymers.

HDPE consists mainly of long linear polyethylene chains. The HDPE employed in the present composition usually has a density of at least 0.94 grams per cubic centimeter (g/cc) as determined by ASTM D 792, and a melt index of from about 0.01 to about 1000, and preferably from about 0.01 to about 100, more preferably from about 0.05 to about 50 grams per 10 minutes (as determined by ASTM Test Method D 1238, Condition 190°/2.16).

The heterogeneous LLDPE employed in the present composition generally has a density of from 0.85 to 0.94 g/cc (ASTM D 792), and melt index of from about 0.01 to about 1000, and preferably from about 0.01 to about 100, more preferably from about 0.05 to about 50 grams per 10 minutes (as determined by ASTM Test Method D 1238, Condition 190°/2.16). Preferably the LLDPE is an interpolymer of ethylene and one or more other α-olefins having from 3 to 18 carbon atoms, more preferably from 3–8 carbon atoms. Preferred comonomers include 1-butene, 4-methyl-1-pentene, 1-hexene, and 1-octene.

A further class is that of the uniformly branched or homogeneous polymers (e.g. homogeneous polyethylene). The homogeneous polymers contain no long chain branches and have only branches derived from the monomers (if having more than two carbon atoms). Homogeneous polymers include those made as described in U.S. Pat. No. 3,645,992 (Elston), and those made using so-called single site catalysts in a batch reactor having relatively high olefin concentrations (as described in U.S. Pat. Nos. 5,026,798 and 5,055,438 (Canich). The uniformly branched/homogeneous polymers are those polymers in which the comonomer is randomly distributed within a given interpolymer molecule and wherein the interpolymer molecules have a similar ethylene/comonomer ratio within that interpolymer.

The homogeneous LLDPE employed in the present composition generally has a density of from 0.85 to 0.94 g/cc (ASTM D 792), and a melt index of from about 0.01 to about 1000, and preferably from about 0.01 to about 100, more preferably from about 0.05 to about 50 grams per 10 minutes (as determined by ASTM Test Method D 1238, Condition 190°/2.16).

Preferably the LLDPE is an interpolymer of ethylene and one or more other α-olefins having from 3 to 18 carbon atoms, more preferably from 3–8 carbon atoms. Preferred comonomers include 1-butene, 4-methyl-1-pentene, 1-hexene, and 1-octene.

Further, there is the class of substantially linear olefin polymers that may advantageously be as a component (B) of the blends used to prepare the foams of the present invention. These polymers have processability similar to LDPE, but the strength and toughness of LLDPE. Substantially linear olefin polymers are disclosed in U.S. Pat. Nos. 5,272,236 and 5,278,272, the entire contents of which are incorporated herein by reference.

The density of the substantially linear olefin polymers as measured in accordance with ASTM D-792 is generally from 0.85 g/cc to 0.97 g/cc, preferably from 0.85 g/cc to 0.955 g/cc, and especially from 0.85 g/cc to 0.92 g/cc and a melt index of from about 0.01 to about 1000, and preferably from about 0.01 to about 100, more preferably from about 0.05 to about 50 grams per 10 minutes (as determined by ASTM Test Method D 1238, Condition 190°/2.16).

Also, included are the ultra low molecular weight ethylene polymers and ethylene/α-olefin interpolymers described in the U.S. patent application Ser. No. 784,683 entitled Ultra-Low Molecular Weight Polymers, filed Jan. 22, 1997 M. J. Guest, et al., which is incorporated herein by reference. These ethylene/α-olefin interpolymers have $I_2$ melt indices greater than 1,000, or a number average molecular weight (Mn) less than 11,000.

Especially preferred olefinic polymers comprise HDPE, heterogeneous LLDPE, homogeneous linear polyethylene, substantially linear olefin polymer, polypropylene (PP), especially isotactic polypropylene, syndiotactic polypropylene and rubber toughened polypropylenes, or ethylene-propylene interpolymers (EP), or chlorinated polyolefins (CPE), or ethylene-vinyl acetate copolymers (EVA), the polymeric ionomer compositions or ethylene-acrylic acid copolymers, or any combination thereof.

Also included in the second polymer component are the so called substantially random interpolymers which comprise polymer units derived from one or more α-olefin monomers with one or more vinyl or vinylidene aromatic monomers and/or a hindered aliphatic or cycloaliphatic vinyl or vinylidene monomers. The term substantially random as used herein means that the distribution of the monomers of said interpolymer can be described by the Bernoulli statistical model or by a first or second order Markovian statistical model, as described by J. C. Randall in *POLYMER SEQUENCE DETERMINATION, Carbon-13 NMR Method*, Academic Press New York, 1977, pp. 71–78. Preferably, substantially random interpolymers do not contain more than 15 percent of the total amount of vinyl or vinylidene aromatic monomer in blocks of vinyl or vinylidene aromatic monomer of more than 3 units. More preferably, the interpolymer is not characterized by a high degree of either isotacticity or syndiotacticity. This means that in the carbon$^{-13}$ NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

Suitable α-olefins include for example, α-olefins containing from 2 to about 20, preferably from 2 to about 12, more preferably from 2 to about 8 carbon atoms. Particularly suitable are ethylene, propylene, butene-1, pentene-1,4-methyl-1-pentene, hexene-1 or octene-1 or ethylene in combination with one or more of propylene, butene-1,4-methyl-1-pentene, hexene-1 or octene-1. These α-olefins do not contain an aromatic moiety.

Suitable vinyl or vinylidene aromatic monomers which can be employed to prepare the interpolymers include, for example, those represented by the following formula:

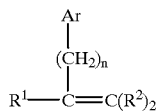

wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to about 4, preferably from zero to 2, most preferably zero. Exemplary vinyl or vinylidene aromatic monomers include styrene, vinyl toluene, α-methylstyrene, t-butyl styrene, chlorostyrene, including all isomers of these compounds, and the like. Particularly suitable such monomers include styrene and lower alkyl- or halogen-substituted derivatives thereof. Preferred monomers include styrene, a-methyl styrene, the lower alkyl-($C_1$–$C_4$) or phenyl-ring substituted derivatives of styrene, such as for example, ortho-, meta-, and para-methylstyrene, the ring halogenated styrenes, para-vinyl toluene or mixtures thereof, and the like. A more preferred aromatic vinyl monomer is styrene.

By the term "hindered aliphatic or cycloaliphatic vinyl or vinylidene compounds", it is meant addition polymerizable vinyl or vinylidene monomers corresponding to the formula:

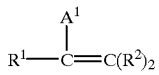

wherein $A^1$ is a sterically bulky, aliphatic or cycloaliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and $A^1$ together form a ring system. By the term "sterically bulky" is meant that the monomer bearing this substituent is normally incapable of addition polymerization by standard Ziegler-Natta polymerization catalysts at a rate comparable with ethylene polymerizations. Preferred hindered aliphatic or cycloaliphatic vinyl or vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred hindered aliphatic or cycloaliphatic vinyl or vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene.

Other optional polymerizable ethylenically unsaturated monomer(s) include norbornene and $C_{1-10}$ alkyl or $C_{6-10}$ aryl substituted norbornenes. Exemplary substantially random interpolymers include ethylene/styrene, ethylene/styrene/propylene, ethylene/styrene/octene, ethylene/styrene/butene, and ethylene/styrene/norbornene interpolymers.

The substantially random interpolymers may be modified by typical grafting, hydrogenation, functionalizing, or other reactions well known to those skilled in the art. The polymers may be readily sulfonated or chlorinated to provide functionalized derivatives according to established techniques.

The substantially random interpolymers may also be modified by various cross-linking processes including, but not limited to peroxide-, silane-, sulfur-, radiation-, or azide-based cure systems. A full description of the various cross-linking technologies is described in copending U.S. patent application Ser. No. 08/921,641, now issued as U.S. Pat. No. 5,869,591, and Ser. No. 08/921,642, now issued as U.S. Pat. No. 5,977,271, both filed on Aug. 27, 1997, the entire contents of both of which are herein incorporated by reference. Dual cure systems, which use a combination of heat, moisture cure, and radiation steps, may be effectively employed. Such dual cure systems are disclosed and claimed in U.S. patent application Ser. No. 536,022, filed on Sep. 29, 1995, in the names of K. L. Walton and S. V. Karande, now issued as U.S. Pat. No. 5,911,940, which is incorporated herein by reference. For instance, it may be desirable to employ peroxide crosslinking agents in conjunction with silane crosslinking agents, peroxide crosslinking agents in conjunction with radiation, sulfur-containing crosslinking agents in conjunction with silane crosslinking agents, etc. The substantially random interpolymers may also be modified by various cross-linking processes including, but not limited to the incorporation of a diene component as a termonomer in its preparation and subsequent cross linking by the aforementioned methods and further methods including vulcanization via the vinyl group using sulfur for example as the cross linking agent.

The substantially random interpolymers include the pseudo-random interpolymers as described in EP-A-0,416,815 by James C. Stevens et al. and U.S. Pat. No. 5,703,187 by Francis J. Timmers, both of which are incorporated herein by reference in their entirety. The substantially random interpolymers also include the substantially random terpolymers as described in U.S. Pat. No. 5,872,201 which is incorporated herein by reference in their entirety. The substantially random interpolymers are best prepared by polymerizing a mixture of polymerizable monomers in the presence of one or more metallocene or constrained geometry catalysts in combination with various cocatalysts. Preferred operating conditions for the polymerization reactions are pressures from atmospheric up to 3000 atmospheres and temperatures from –30° C. to 200° C. Polymerizations and unreacted monomer removal at temperatures above the autopolymerization temperature of the respective monomers may result in formation of some amounts of homopolymer polymerization products resulting from free radical polymerization.

Examples of suitable catalysts and methods for preparing the substantially random interpolymers are disclosed in EP-A-416,815; EP-A-514,828; EP-A-520,732; and EP-B-705,269; as well as U.S. Pat. Nos. 5,055,438; 5,057,475; 5,096,867; 5,064,802; 5,132,380; 5,189,192; 5,321,106; 5,347,024; 5,350,723; 5,374,696; 5,399,635; and 5,470,993, all of which patents and applications are incorporated herein by reference.

The substantially random α-olefin/vinyl or vinylidene aromatic interpolymers can also be prepared by the methods described in JP 07/278230 employing compounds shown by the general formula

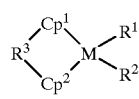

where $Cp^1$ and $Cp^2$ are cyclopentadienyl groups, indenyl groups, fluorenyl groups, or substituents of these, independently of each other; $R^1$ and $R^2$ are hydrogen atoms, halogen atoms, hydrocarbon groups with carbon numbers of 1–12, alkoxyl groups, or aryloxyl groups, independently of each other; M is a group IV metal, preferably Zr or Hf, most preferably Zr; and $R^3$ is an alkylene group or silanediyl group used to cross-link $Cp^1$ and $Cp^2$).

The substantially random α-olefin/vinyl or vinylidene aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in *Plastics Technology*, p. 25 (September 1992), all of which are incorporated herein by reference in their entirety.

Also suitable are the substantially random interpolymers which comprise at least one (α-olefin/vinyl aromatic/vinyl aromatic/α-olefin tetrad disclosed in WO 98/09999. These interpolymers contain additional signals with intensities greater than three times the peak to peak noise. These signals appear in the chemical shift range 43.70–44.25 ppm and 38.0–38.5 ppm. Specifically, major peaks are observed at 44.1, 43.9 and 38.2 ppm. A proton test NMR experiment indicates that the signals in the chemical shift region 43.70–44.25 ppm are methine carbons and the signals in the region 38.0–38.5 ppm are methylene carbons.

Further preparative methods for the interpolymers used in the present invention have been described in the literature. Longo and Grassi (*Makromol. Chem.*, Volume 191, pages 2387 to 2396 [1990]) and D'Anniello et al. (Journal of Applied Polymer Science, Volume 58, pages 1701–1706 [1995]) reported the use of a catalytic system based on methylalumoxane (MAO) and cyclopentadienyltitanium trichloride ($CpTiCl_3$) to prepare an ethylene-styrene copolymer. Xu and Lin (*Polymer Preprints, Am. Chem. Soc., Div. Polym. Chem.*) Volume 35, pages 686,687 [1994]) have reported copolymerization using a $MgCl_2/TiCl_4/NdCl_3/Al(iBu)_3$ catalyst to give random copolymers of styrene and propylene. Lu et al (*Journal of Applied Polymer Science*, Volume 53, pages 1453 to 1460 [1994]) have described the copolymerization of ethylene and styrene using a $TiCl_4/NdCl_3/MgCl_2/Al(Et)_3$ catalyst. Sernetz and Mulhaupt, (*Macromol. Chem. Phys.*, v. 197, pp. 1071–1083, 1997) have described the influence of polymerization conditions on the copolymerization of styrene with ethylene using $Me_2Si(Me_4Cp)(N$-tert-butyl$)TiCl_2$/methylaluminoxane Ziegler-Natta catalysts. Copolymers of ethylene and styrene produced by bridged metallocene catalysts have been described by Arai, Toshiaki and Suzuki (*Polymer Preprints, Am. Chem. Soc., Div. Polym. Chem.*) Volume 38, pages 349, 350 [1997]) and in U.S. Pat. No. 5,652,315, issued to Mitsui Toatsu Chemicals, Inc. The manufacture of α-olefin/vinyl aromatic monomer interpolymers such as propylene/styrene and butene/styrene are described in U.S. Pat. No. 5,244,996, issued to Mitsui Petrochemical Industries Ltd or U.S. Pat. No. 5,652,315 also issued to Mitsui Petrochemical Industries Ltd or as disclosed in DE 197 11 339 A1 and U.S. Pat. No. 5,883,213 to Denki Kagaku Kogyo K K. All the above methods disclosed for preparing the interpolymer component are incorporated herein by reference. Also, the random copolymers of ethylene and styrene as disclosed in Polymer Preprints Vol 39, No. 1, March 1998 by Toru Aria, et al. can also be employed as blend components for the foams of the present invention.

The substantially random interpolymers usually contain from about 0.5 to about 65, preferably from about 1 to about 55, more preferably from about 1 to about 50 mole percent of at least one vinyl or vinylidene aromatic monomer and/or hindered aliphatic or cycloaliphatic vinyl or vinylidene monomer and from about 35 to about 99.5, preferably from about 45 to about 99, more preferably from about 50 to about 99 mole percent of ethylene and/or at least one aliphatic α-olefin having from 3 to about 20 carbon atoms.

The substantially random interpolymer(s) applicable to the present invention can have a melt index of from about 0.01 to about 1000, and preferably from about 0.01 to about 100, more preferably from about 0.05 to about 50 grams per 10 minutes (as determined by ASTM Test Method D 1238, Condition 190°/2.16).

While preparing the substantially random interpolymer, an amount of atactic vinyl or vinylidene aromatic homopolymer may be formed due to homopolymerization of the vinyl or vinylidene aromatic monomer at elevated temperatures. The presence of vinyl or vinylidene aromatic homopolymer is in general not detrimental for the purposes of the present invention and can be tolerated. The vinyl or vinylidene aromatic homopolymer may be separated from the interpolymer, if desired, by extraction techniques such as selective precipitation from solution with a non solvent for either the interpolymer or the vinyl or vinylidene aromatic homopolymer. For the purpose of the present invention it is preferred that no more than 20 weight percent, preferably less than 15 weight percent, most preferably less than 10 weight percent based on the total weight of the interpolymers of atactic vinyl or vinylidene aromatic homopolymer is present.

Most preferred as the second polymer component are the substantially random interpolymers such as those marketed by The Dow Chemical Company under the INDEX™ tradename, the polyolefin plastomers, such as those marketed by The Dow Chemical Company under the AFFINITY™ tradename and polyethylene elastomers, such as those marketed by Du Pont Dow Elastomers LLC under the ENGAGE™ tradename.

Flame Retardant

As the foam will be used as acoustical insulation in buildings, it will also contain a flame retardant which functions to extinguish flames or at least slow the spread of fire in the foam. Suitable flame retardants are well-known in the art and include but are not limited to hexahalodiphenyl ethers, tetrabromobisphenol A bis (2,3-dibromopropyl ether) octahalodiphenyl ethers, decahalodiphenyl ethers, decahalobiphenyl ethanes, 1,2-bis(trihalophenoxy)ethanes, 1,2-bis (pentahalophenoxy)ethanes, hexahalocyclododecane, a tetrahalobisphenol-A, ethylene(N,N')-bis-tetrahalophthalimides, tetrahalophthalic anhydrides, hexahalobenzenes, halogenated indanes, halogenated phosphate esters, halogenated paraffins, halogenated polystyrenes, and polymers of halogenated bisphenol-A and epichlorohydrin, or mixtures thereof. Preferably, the flame retardant is a bromine or chlorine containing compound. The halogenated flame-retardants may include one or more of hexabromocycledodecane (HBCD), tetrabromobisphenol-A-(TBBA), chlorowax and may be used with or without flame retardant synergists. Commercially available products suitable for use as flame retardants in the present invention include PE-68™ (a trademark and product of the Great Lakes Chemical Corporation). Suitable flame retardants are well known, and include brominated organic compounds such as are described in U.S. Pat. No. 4,446,254 and U.S. Pat. No. 5,171,757, the entire contents of which are herein incorporated by reference. For foams, the halogen content in the final foams should be 0.05–20 wt %, preferably 0.1–15 wt % and most preferably 0.2–10 wt %.

In a preferred embodiment, the flame retardant is a hexahalocyclododecane, preferably hexabromocyclododecane (HBCD), or tetrabromobisphenol A bis (2,3-dibromopropyl ether), PE™-68, or a combination with any other halogenated or non-halogenated flame-retardants, which can include, but are not limited to phosphorous based flame retardants such as triphenyl phosphate and encapsulated red phosphorous.

In the case of halogenated flame retardants, preferred loadings or amounts depend on the application and the desired level of flame retardants but are those which typically yield halogen contents of about 0.05 to 20 phr in foamed structures.

Flame Retardant Synergist

Optionally a flame retardant synergist may be added along with the flame retardant. Examples of inorganic flame retardant synergists include, but are not limited to, metal oxides, e.g. iron oxide, tin oxide, zinc oxide, aluminum trioxide, alumina, antimony trioxide and antimony pentoxide, bismuth oxide, molybdenum trioxide, and tungsten trioxide, boron compounds such as zinc borate, antimony silicates, zinc stannate, zinc hydroxystannate, ferrocene and mixtures thereof. Examples of organic flame retardant synergists include, but are not limited to organic peroxides, such as dicumyl peroxide and polycumyl peroxide. Synergistic combinations, such as mixtures of one or more halogenated compounds and one or more flame retardant synergists, typically are used preferably at a ratio of about 0.25 to about 25, preferably 0.5 to about 15, more preferably from about 0.5 to about 10 parts by weight flame retardant halogen to 1 part by weight of flame retardant synergist.

Stability Control Agent or Cell Size Enlarging Agent

A stability control agent or cell size enlarging agent is optionally added to the present foam to enhance dimensional stability. Preferred agents include amides and esters of C10–24 fatty acids. Such agents are seen in U.S. Pat. Nos. 3,644,230 and 4,214,054, which are 108° C. incorporated herein by reference. Most preferred agents include stearyl stearamide, glycerol monostearate (available from ICI Americas Inc., under the trademark Atmer™ 129), glycerol monobehenate, and sorbitol monostearate. Typically, such stability control agents are employed in an amount ranging from about 0.1 to about 10 parts per hundred parts of the polymer.

Other Additives.

Additives such as antioxidants such as hindered phenols (e.g., Irganox™ 1010), and phosphites (e.g., Irgafos™ 168) both of which are trademarks of and available from the Ciba Geigy corporation), U.V. Stabilizers, cling additives (e.g., polyisobutylene), antiblock additives, colorants, pigments, fillers, acid scavengers (including, but not limited to, zeolite, organic carboxylates and hydrotalcite) and the like can optionally also be included in the compositions and fabricated articles of the present invention, to the extent that they do not interfere with their enhanced properties.

The additives are advantageously employed in functionally equivalent amounts known to those skilled in the art. For example, the amount of antioxidant employed is that amount which prevents the polymer or polymer blend from undergoing oxidation at the temperatures and environment employed during storage and ultimate use of the polymers. Such amount of antioxidants is usually in the range of from 0.01 to 10, preferably from 0.05 to 5, more preferably from 0.1 to 2 percent by weight based upon the weight of the polymer or polymer blend.

Similarly, the amounts of any of the other enumerated additives are the functionally equivalent amounts such as the amount to render the polymer or polymer blend antiblocking, to produce the desired amount of filler loading to produce the desired result, to provide the desired color from the colorant or pigment. Such additives are advantageously employed in the range of from 0 to 50, preferably from 0 to 35, more preferably from 0 to 20 percent by weight based upon the weight of the polymer or polymer blend.

Preferred examples of fillers are talc, carbon black, carbon fibers, calcium carbonate, alumina trihydrate, glass fibers, marble dust, cement dust, clay, feldspar, silica or glass, filmed silica, alumina, magnesium oxide, magnesium hydroxide, antimony oxide, zinc oxide, barium sulfate, aluminum silicate, calcium silicate, titanium dioxide, titanates, glass microspheres or chalk. Of these fillers, barium sulfate, talc, calcium carbonate, silica/glass, glass fibers, alumina and titanium dioxide, and mixtures thereof are preferred. The most preferred inorganic fillers are talc, calcium carbonate, barium sulfate, glass fibers or mixtures thereof. These fillers could be employed in amounts from 0 to about 90, preferably from 0 to about 80, more preferably from 0 to about 70% by weight based on the weight of the polymer or polymer blend.

One type of additive found useful in the polymer compositions used to prepare the foams of the present invention are lubricating agents. Such additives are better known by a variety of more common names such as slip agent or release agent which seem to depend upon the particular property modification contemplated for the additive. Illustrative lubricating agents, preferably solid lubricating agents, include organic materials such as silicones, particularly dimethylsiloxane polymers, fatty acid amides such as ethylene bis(stearamides), oleamides and erucamide; and metal salts of fatty acids such as zinc, calcium, or lead stearates. Also suitable are inorganic materials such as talc, mica, fumed silica and calcium silicate. Particularly preferred are the fatty acid amides, oleamides, and erucamide. Quantities of lubricating agent of from about 0 to about 5% by weight based on the total weight of the mixture are satisfactory, more preferred are quantities of from about 0 to about 4% by weight.

Applications for the macrocellular flame resistant acoustic compositions of the present invention include articles made by all the various extrusion processes. Such articles may be used in automotive and other transportation devices, building and construction, household and garden appliances, power tool and appliance and electrical supply housing, connectors, and aircraft as acoustic systems for sound absorption and insulation. The materials are especially suited to applications where, in addition to meeting the relevant acoustic performance standards, they must also meet any applicable fire test codes, for example office partitions, automotive decouplers, domestic appliance sound insulation, and sound proofing panels and machine enclosures.

The foams of the present invention has excellent acoustic absorption capabilities. One way to measure the ability to absorb sound is to measure the acoustic absorption coefficient of the foam according to ASTM E-1050 at 25, 500, 1000 and 2000 Hz and then calculate the arithmetic average of those sound absorption coefficients. When that determination is made with the foams of the present invention, the average sound absorption coefficient is greater than about 0.15, preferably greater than about 0.20, more preferably greater than about 0.25, even more preferably greater than about 0.30. Thus the foams of this invention is useful for absorbing sound in the range from 250 to 2000 Hz such that the sound absorption capability is equivalent to the foregoing preferred average sound absorption coefficients. For example, the foam may be located in the presence of a sound intensity of at least 50 decibels, such as on a vehicle equipped with a combustion engine.

The foregoing list merely illustrates a number of suitable applications. Skilled artisans can readily envision additional applications without departing from the scope or spirit of the present invention.

The following examples illustrate, but do not in any way limit the scope of the present invention.

EXAMPLES

Test Methods a) Melt Flow Measurements

The molecular weight of the polymer compositions for use in the present invention is conveniently indicated using a melt index measurement according to ASTM D-1238, Condition 190° C./2.16 kg (formally known as "Condition (E)" and also known as $I_2$) was determined. Melt index is inversely proportional to the molecular weight of the polymer. Thus, the higher the molecular weight, the lower the melt index, although the relationship is not linear.

b) Styrene Analyses

Interpolymer styrene content and the concentration of atactic polystyrene homopolymer impurity in the ESI interpolymers was determined using proton nuclear magnetic resonance ($^1$H NMR). All proton NMR samples were prepared in 1,1,2,2-tetrachloroethane-$d_2$ (tce-$d_2$). The resulting solutions contained approximately 1–3 weight percent polymer. The interpolymers were weighed directly into 5-mm sample tubes. A 0.75-ml aliquot of tce-$d_2$ was added by syringe and the tube sealed with a tight-fitting cap. The samples were heated at 85° C. to soften the interpolymer. To provide mixing, the capped samples were occasionally brought to reflux using a heat gun.

Proton NMR spectra were accumulated with the sample probe at 80° C., and referenced to the residual protons of tce-$d_2$ at 5.99 ppm. Data was collected in triplicate on each sample using the following instrumental conditions:

Sweep width, 5000 Hz
Acquisition time, 3.002 sec
Pulse width, 8 μsec
Frequency, 300 MHz
Delay, 1 sec
Transients, 16

The total analysis time per sample was about 10 minutes.

Initially, a spectrum for a sample of polystyrene (192,000 $M_w$) was acquired. Polystyrene has five different types of protons that are distinguishable by proton NMR. In FIG. 1, these protons are labeled b, branch; α, alpha; o, ortho; m, meta; p, para, as shown in FIG. 1. For each repeating unit in the polymer, there are one branch proton, two-alpha protons, two ortho protons, two meta protons and one para proton.

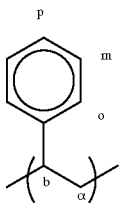

The NMR spectrum for polystyrene homopolymer includes a resonance centered around a chemical shift of about 7.1 ppm, which is believed to correspond to the three ortho and para protons. The spectrum also includes another peak centered around a chemical shift of about 6.6 ppm. That peak corresponds to the two meta protons. Other peaks at about 1.5 and 1.9 ppm correspond to the three aliphatic protons (alpha and branch).

The relative intensities of the resonances for each of these protons were determined by integration. The integral corresponding to the resonance at 7.1 ppm was designated $PS_{7.1}$ below. That corresponding to the resonance at 6.6 ppm was designated $PS_{6.6}$, and that corresponding to the aliphatic protons (integrated from 0.8–2.5 ppm) was designated $PS_{al}$. The theoretical ratio for $PS_{7.1}$: $PS_{6.6}$: $PS_{al}$ is 3:2:3, or 1.5:1:1.5. For atactic polystyrene homopolymer, all spectra collected had the expected 1.5:1:1.5 integration ratio. An aliphatic ratio of 2 to 1 is predicted based on the protons labeled a and b respectively in FIG. 1. This ratio was also observed when the two aliphatic peaks were integrated separately. Further, the ratio of aromatic to aliphatic protons was measured to be 5 to 3, as predicted from theoretical considerations.

The $^1$H NMR spectrum for the ESI interpolymer was then acquired. This spectrum showed resonances centered at about 7.1 ppm, 6.6 ppm and in the aliphatic region. However, the 6.6 ppm peak was relatively much weaker for the ESI interpolymer than for the polystyrene homopolymer. The relative weakness of this peak is believed to occur because the meta protons in the ESI copolymer resonate in the 7.1 ppm region. Thus, the only protons that produce the 6.6 ppm peak are meta protons associated with atactic polystyrene homopolymer that is an impurity in the ESI. The peak centered at about 7.1 ppm thus includes ortho, meta and para protons from the aromatic rings in the ESI interpolymer, as well as the ortho and para protons from the aromatic rings in the polystyrene homopolymer impurity. The peaks in the aliphatic region include resonances of aliphatic protons from both the ESI interpolymer and the polystyrene homopolymer impurity.

Again, the relative intensities of the peaks were determined by integration. The peak centered around 7.1 ppm is referred to below as $I_{7.1}$, that centered around 6.6 ppm is $I_{6.6}$ and that in the aliphatic regions is $I_{a1}$.

$I_{7.1}$ includes a component attributable to the aromatic protons of the ESI interpolymer and a component attributable to the ortho and para protons of the aromatic rings of the polystyrene homopolymer impurity. Thus, $$I_{7.1} = I_{c7.1} + I_{ps7.1}$$

where $I_{c7.1}$ is the intensity of the 7.1 ppm resonance attributable to the aromatic protons in the interpolymer and $I_{ps7.1}$ is the intensity of the 7.1 ppm resonance attributable to the ortho and meta protons of the polystyrene homopolymer.

From theoretical considerations, as confirmed by the $^1$H NMR spectrum of the polystyrene homopolymer, the intensity of the 7.1 ppm resonance attributable to the polystyrene homopolymer impurity ($I_{ps7.1}$), equals 1.5 times the intensity of the 6.6 ppm resonance. This provides a basis for determining $I_{c7.1}$ from measured values, as follows:

$$I_{c7.1} = I_{7.1} - 1.5(I_{6.6}).$$

Similarly, $I_{a1}$ can be resolved into resonances attributable to the ESI and the polystyrene homopolymer impurity using the relationship $$I_{al} = I_{cal} + I_{psal}$$

wherein $I_{cal}$ is the intensity attributable to the aliphatic protons on the interpolymer and $I_{psal}$ is the intensity attributable to the aliphatic protons of the polystyrene homopolymer impurity. Again, it is known from theoretical considerations and the spectrum from the atactic polystyrene homopolymer that $I_{psal}$ will equal 1.5 times $I_{6.6}$. Thus the following relationship provides a basis for determining $I_{cal}$ from measured values:

$$I_{cal} = I_{al} - 1.5(I_{6.6}).$$

The mole percent ethylene and styrene in the interpolymer are then calculated as follows:

$$s_c = I_{c7.1}/5$$

$$e_c = (I_{cal} - (3 \times s_c))/4$$

$$E = e_c/(s_c + e_c),$$

and $$S = s_c/(s_c + e_c),$$

wherein E and S are the mole fractions of copolymerized ethylene and styrene, respectively, contained in the interpolymer.

Weight percent ethylene and styrene were calculated using the equations $$\text{Wt \% } E = \frac{100\% * 28E}{(28E + 104S)} \text{ and}$$

$$\text{Wt \% } S = \frac{100\% * 104S}{(28E + 104S)}.$$

The weight percent of polystyrene homopolymer impurity in the ESI sample was then determined by the following equation:

$$\text{Wt \% } PS = \frac{100\% * Wt\%S * (I_{6.6}/2S)}{100 - [Wt\%S * (I_{6.6}/2S)]}.$$

The total styrene content was also determined by quantitative Fourier transform infrared spectroscopy (FTIR).

Materials Used to Prepare the Foams of the Present Invention

1. LDPE 1 is commercially available as LDPE 400R which is a low density polyethylene (LDPE) with a density of 0.925 g/cm³ and melt index of 1.0 dg/min and available from The Dow Chemical Company.
2. LDPE 2 is commercially available as LDPE 620i which is a low density polyethylene (LDPE) with a density of 0.924 g/cc and melt index of 1.8 dg/min (according to ASTM D1238, 190° C./2.16 kg) and available from The Dow Chemical Company.
3. ESI 1 is commercially available as DS201 which is a substantially random ethylene styrene interpolymer (ESI) with a nominal styrene content of 37.5 mol % (69 wt %) and melt index of 1 dg/min (according to ASTM D1238, 190° C./2.16 kg) and available from The Dow Chemical Company.
4. HMS PP 1 is commercially available as Profax PF814 which is a high melt strength polypropylene with a melt index of 3 dg/min (according to ASTM D1238, 230° C./2.16 kg) and available from Montell.
5. PE-68™ is a brominated fire retardant having 68 wt % bromine content (tetrabromobisphenol A bis (2,3-dibromopropyl ether) 30% concentrate in LDPE) and is a trademark of and available from The Great Lakes Chemical Corporation.
6. TRUTINT™ 50 is antimony trioxide, $SbO_3$ of average particle size of 3 microns (used as an 80% concentrate in LDPE) and is a trademark of and available from The Great Lakes Chemical Corporation.
7. TMS™ is antimony trioxide, $SbO_3$ of average particle size of 1.5 microns (used as an 80% concentrate in LDPE) and is a trademark of and available from The Great Lakes Chemical Corporation.
8. CHLOREZ™ 700 is chlorinated paraffin containing 70 wt % chlorine and is a trademark of and available from the Dover Chemical Corporation.
9. CHLOREZ™ 760 is chlorinated paraffin containing 74 wt % chlorine and is a trademark of and available from the Dover Chemical Corporation.
10. SAYTEX™ HP-900 is hexabromocyclododecane containing about 75 wt % bromine and is a trademark of and available from the Albemarle Corporation.

Example 1

This example illustrates the experimental method for determining the critical prefoaming die pressure a flame retardant polyethylene formulation. The foams listed in Table 1 were prepared in commercial extrusion equipment. The laboratory scale single screw extruder consisted of a feeding zone for solid additives and resins, a melting zone and a metering zone. In addition, there was a mixing zone with a port to inject the blowing agent and liquid additives, a cooling zone to uniformly cool the melt to the foaming temperature and a die body. The foaming temperature is the optimal gel temperature for foaming when the melt strength is high enough to stabilize the foam and prevent cell collapse. The melt is extruded through a die to room temperature and pressure to expand the gel and stabilize the resulting foam.

Low density polyethylene (LDPE 1) with a density of 0.925 g/cm³ and melt index of 1.0 dg/min (according to ASTM D1238, 190° C./2.16 kg) was fed from a feed hopper to the extruder. The levels of additives used in the formulation are reported in parts by weight per hundred parts by weight of the polymer resin blend (pph). The following additives were added: 0.3 pph glycerol monostearate, 4 pph of the brominated flame retardant (PE-68, tetrabromobisphenol A bis (2,3-dibromopropyl ether) 30% concentrate in LDPE) and 2 pph of the synergist (Trutint™ 50, antimony trioxide 80% concentrate in LDPE). Isobutane at 9 pph was injected into the mixing zone. The temperature of the cooling zone and die block was gradually reduced to the foaming temperature range to produce stable foam. At a die temperature of 108° C., the die opening was changed to vary the pressure at the die. The results of the change in die pressure on cell size and foam appearance are shown in Table 1. At high die pressure (>3000 kPa), the foam nucleated significantly and cell size was small. As the die pressure was reduced, the foam quality improved and the cell size became larger. Finally, at the prefoaming pressure, the quality of the foam deteriorated sharply (very rough skin due to rupture of surface cells) and a crackling noise was heard at the die due to rapid degassing of the blowing agent. The prefoaming critical die pressure this formulation is 650 kPa.

TABLE 1

| Example # | Die pressure, kPa | Die opening[1], mm | Average cell size[2], mm | Comments |
|---|---|---|---|---|
| Ex 1 | 3530 | 0.82 | 4.37 | Collapsed foam |
| Ex 1 | 3060 | 0.88 | 4.01 | Slight collapsed foam |
| Ex 1 | 2590 | 1.00 | 4.85 | Slight collapsed foam |
| Ex 1 | 2420 | 1.10 | 5.58 | Slight collapsed foam |
| Ex 1 | 2030 | 1.28 | 5.02 | Slight collapsed foam |
| Ex 1 | 1850 | 1.32 | 5.74 | Slight collapsed foam |
| Ex 1 | 1680 | 1.52 | 6.13 | Moderate quality foam |
| Ex 1 | 1390 | 1.64 | 6.46 | Good quality foam |
| Ex 1 | 1250 | 1.76 | 6.97 | Good quality foam |
| Ex 1 | 1180 | 2.00 | 8.52 | Good quality foam, big cells |
| Ex 1 | 980 | 2.20 | 7.87 | Good quality foam, big cells |
| Ex 1 | 920 | 2.20 | 8.23 | Good quality foam, big cells |
| Ex 1 | 830 | 2.36 | 11.59 | Good quality foam, big cells |
| Ex 1 | 760 | 2.50 | 11.95 | Good quality foam, big cells |
| Ex 1 | 650 | 2.64 | 10.13 | Start of prefoaming, rough skin |
| Ex 1 | 490 | 2.90 | 10.08 | Significant prefoaming, very rough skin |

[1]die width: 6 mm
[2]3-d average cell size measured by ASTM D3576

Example 2

This example also illustrates the experimental method for determining the prefoaming critical die pressure for a flame retardant polyethylene formulation.

A formulation similar to that used in Example 1 was foamed using a higher level of glycerol mono stearate (GMS). The levels of additives used in the formulation are reported in parts by weight per hundred parts by weight of the polymer resin blend (pph). The level of GMS used was 1.3 pph. All other process conditions were the same as Example 1. The foaming temperature was 108° C. The prepared foams are listed in Table 2. In this case, the prefoaming critical die pressure for this formulation is between 350 kPa and 720 kPa.

TABLE 2

| Example # | Die pressure, kPa | Die opening[1], mm | Average cell size[2], mm | Comments |
|---|---|---|---|---|
| Ex 2 | 1220 | 1.54 | 5.76 | Slightly collapsed foam |
| Ex 2 | 940 | 1.80 | 6.77 | Moderate quality foam |
| Ex 2 | 820 | 1.94 | 7.17 | Good quality foam, big cells |
| Ex 2 | 720 | 2.16 | 8.89 | Good quality foam, big cells |

TABLE 2-continued

| Example # | Die pressure, kPa | Die opening[1], mm | Average cell size[2], mm | Comments |
|---|---|---|---|---|
| Ex 2 | 350 | 3.00 | n.d.[3] | Prefoaming, rough skin surface |

[1]die width: 6 mm
[2]3-d average cell size measured by ASTM D3576
[3]cell size not measured due to very poor quality foam Example Three The following example also illustrates the experimental method for determining the prefoaming critical die pressure for a non flame retardant polyethylene formulation. A formulation similar to that used in Example 2 without the brominated flame retardant and the synergist. The foaming temperature was 108° C., all other process conditions were the same as before. The prepared foams are listed in Table 3. In this case, the prefoaming critical die pressure for this formulation is 760 kPa.

TABLE 3

| Example # | Die pressure, kPa | Die opening[1], mm | Average cell size[2], mm | Comments |
|---|---|---|---|---|
| Ex 3 | 3530 | 0.78 | 7.02 | Slightly collapsed foam |
| Ex 3 | 3260 | 0.82 | 6.75 | Slightly collapsed foam |
| Ex 3 | 2830 | 0.93 | 7.22 | Slightly collapsed foam |
| Ex 3 | 2460 | 1 | 8.58 | Moderate quality foam |
| Ex 3 | 2210 | 1.08 | 8.58 | Moderate quality foam |
| Ex 3 | 1900 | 1.25 | 8.52 | Moderate quality foam |
| Ex 3 | 1620 | 1.4 | 8.59 | Good quality foam |
| Ex 3 | 1480 | 1.47 | 9.99 | Good quality foam |
| Ex 3 | 1390 | 1.62 | 9.78 | Good quality foam |
| Ex 3 | 1200 | 1.72 | 9.69 | Good quality foam |
| Ex 3 | 940 | 1.9 | 11.05 | Good quality foam, big cells |
| Ex 3 | 920 | 2 | 9.49 | Good quality foam, big cells |
| Ex 3 | 760 | 2.2 | 10.6 | Start of prefoaming, popping sound at die |
| Ex 3 | 630 | 2.5 | 10.89 | Rough skin on the edges |
| Ex 3 | 590 | 2.7 | 11.25 | Rough skin on the edges |
| Ex 3 | 530 | 3 | 10.8 | Significant prefoaming, very rough skin |

[1]die width: 6 mm
[2]3-d average cell size measured by ASTM D3576

Example 4

This example describes the formulation and the process conditions to make large cell acoustic foam with flame retardants and synergists.

The foams were prepared in commercial extrusion equipment. The pilot scale single screw extruder consisted of a feeding zone for solid additives and resins, a melting zone and a metering zone. In addition, there was a mixing zone with a port to inject the blowing agent and liquid additives, a cooling zone to uniformly cool the melt to the foaming temperature and a die body. A gear pump between the metering and mixing zones stabilized the melt flow rate. The foaming temperature is the optimal gel temperature for foaming when the melt strength is high enough to stabilize the foam and prevent cell collapse. The melt is extruded through a die to room temperature and pressure to expand the gel and stabilize the resulting foam.

For this Example 4, low density polyethylene with a density of 0.925 g/cm$^3$ and melt index of 1.0 dg/min (according to ASTM D1238, 190° C./2.16 kg) was fed to the extruder. The levels of additives used in the formulation are reported in parts by weight per hundred parts by weight of the polymer resin blend (pph). For the comparative foam (Comp Ex 1) the following additive was used: 0.1 pph Irganox 1010 antioxidant (Tetrakis [methylene(3,5-di-tert-butyl-4-hydroxyhydrocinnamate)] methane. Isobutane at 8.5 pph was injected into the mixing zone and glycerol monostearate at 1.5 pph was melt injected. For the flame retardant foam of Example 4, the following ingredients were added to the formulation: 5 pph of the brominated flame retardant (PE-68, tetrabromobisphenol A bis (2,3-dibromopropyl ether) 30% concentrate in LDPE) and 1.4 pph of the synergist (TMS™ antimony trioxide 1.5 micron average particle size 80% concentrate in LDPE).

The gel residence time in the extrusion line was 45 min. The gel temperature was the highest in the mixing zone (200° C.) and the gel pressure was highest at the gear pump outlet (18540 kPa). The hot gel was cooled to the foaming temperature (104° C.). The gel temperature of the adjustable die (50 mm wide×3.3 mm high) was maintained at 104° C. and the gel pressure at the die was kept at 1300 kPa. Note the die pressure is approximately 2× the prefoaming critical die pressure. Macrocellular foam of excellent quality was obtained.

For the comparative foam (Comp Ex 1) made with no flame retardant package, the average cell size was 11.7 mm and the fresh density was 47.8 kg/m3.

For the foam of Example 4 made with the flame retardant package, the average cell size was 10.4 mm and the fresh density was 33.5 kg/m3.

The comparative foam (Comp Ex 1) failed the DIN-4102 B2 flame test and the UL-94 flame test. The flame retardant (Example 4) foam passed the DIN-4102 test with B2 rating (with paper burning) and passed the UL-94 test with 94 HF-2 rating (with burning droplets).

The comparative (Comp Ex 1) and the flame retardant foam (Example 4) both with skin, no perforations and 25 mm thickness were tested for acoustic performance using ASTM E-1050 (Impedance Tube Method). The acoustic results, tabulated below, show that the comparative (Comp Ex 1) and the flame retardant foam (Example 4) are very comparable.

TABLE 4

| | Sound absorption coefficients (SAC) | | | | | Max SAC (0–4000 Hz) | | Average |
|---|---|---|---|---|---|---|---|---|
| Sample | 250 Hz | 500 Hz | 1000 Hz | 2000 Hz | 4000 Hz | SAC max | Frequency[1] | SAC[2] |
| Comp Ex 1 | 0.075 | 0.45 | 0.7 | 0.35 | 0.55 | 0.825 | 800 | 0.39 |
| Example 4 | 0.075 | 0.35 | 0.75 | 0.425 | 0.4 | 0.825 | 800 | 0.40 |

[1]Frequency corresponding to the maximum sound absorption
[2]Average SAC is the mean SAC of the following frequencies: 250 Hz, 500 Hz, 1000 Hz, and 2000 Hz

Example 5

This example details the effect of nucleators that are used in the formulation on foam cell size and hence acoustic properties.

The formulation was made in the same commercial extrusion equipment as described in Example 4. For this example, a 85/15 wt % blend of low density polyethylene (LDPE 1) with a density of 0.925 g/cm$^3$ and melt index of 1.0 dg/min (according to ASTM D1238, 190° C./2.16 kg) and a substantially random ethylene styrene interpolymer (ESI 1) with a nominal styrene content of 69 wt % and melt index of 1 dg/min (according to ASTM D1238, 190° C./2.16 kg) was fed to the extruder. The levels of additives used in the formulation are reported in parts by weight per hundred parts by weight of the polymer resin blend (pph). The ESI 1 resin contained approximately 1 pph of dusted talc as an anti-block agent that acts as a powerful nucleator. Isobutane at 8.5 pph was injected into the mixing zone and glycerol monostearate at 1.5 pph was melt injected. 0.1 pph Irganox™ 1010 antioxidant (Tetrakis [methylene(3,5-di-tert-butyl-4-hydroxyhydrocinnamate)] methane and 3.2 pph carbon black concentrate were fed into the extruder. The flame retardant package comprised 5.5 pph of the brominated flame retardant (PE-68, tetrabromobisphenol A bis (2,3-dibromopropyl ether) 30% concentrate in LDPE) and 0.55 pph of the synergist (TMS™ antimony trioxide, 1.5 micron average particle size, 80% concentrate in LDPE).

The gel residence time in the extrusion line was 45 min. The gel temperature was the highest in the mixing zone (197° C.) and the gel pressure was highest at the gear pump outlet (17000 kPa). The hot gel was cooled to the foaming temperature (106° C.). The gel temperature of the adjustable die (50 nun wide×3 mm high) was maintained at 103.4° C. and the pressure at the die was kept at 1170 kPa. Note the die pressure is approximately 2× the prefoaming critical die pressure. Macrocellular foam of excellent quality was obtained.

For the run made with the flame retardant package (Ex 5), the average cell size was 5.5 mm and the fresh density was 31.7 kg/m3. The cell size is significantly smaller than that of Example 4.

The flame retardant foam passed the UL-94 test with 94 HBF rating and the ASTM E-84 Steiner Tunnel test with Class A rating.

The flame retardant foam with skin, no perforations and 25 mm thickness was tested for acoustic performance using ASTM E-1050 (Impedance Tube Method). The results are tabulated below:

Example 6

This example illustrates the effect of additives like glycerol monostearate and propylene glycol/ethanol mixtures on foam cell size and hence acoustic performance.

Trials were made using the equipment and process conditions detailed in Example 1. The levels of additives used in the formulation are reported in parts by weight per hundred parts by weight of the polymer resin blend (pph). The following formulation was used: low density polyethylene (LDPE 1) with a density of 0.925 g/cm$^3$ and melt index of 1.0 dg/min (according to ASTM D1238, 190° C./2.16 kg), 9 pph isobutane, 5 pph of the brominated flame retardant (PE-68, tetrabromobisphenol A bis (2,3-dibromopropyl ether) 30% concentrate in LDPE) and 2 pph of the synergist (Trutint™ 50 antimony trioxide 80% concentrate in LDPE). The glycerol mono stearate (GMS) level (percent by weight based on polymer) was varied with all other conditions kept the same. The results are presented in Table 6 and show that an increase in GMS level results in an increase in cell size but that beyond a critical value, increase in GMS level results in a decrease in cell size. Note that GMS increases cell size during foaming and provides dimensional stability during aging.

TABLE 6

| Example # | GMS level[1], pph | Average cell size[2], mm |
|---|---|---|
| Ex 6a | 2.5 | 5.9 |
| Ex 6b | 5.0 | 7.3 |
| Ex 6c | 7.5 | 4.4 |

[1]parts by weight per hundred parts by weight polymer
[2]3-d average cell size measured by ASTM D3576

Example 7

Trials were made using the equipment and process conditions detailed in Example 4. The following formulation was used: 70/30 wt % blend of low density polyethylene (LDPE 1) with a density of 0.925 g/cm$^3$ and melt index of 1.0 dg/min (according to ASTM D1238, 190° C./2.16 kg) and a substantially random ethylene styrene interpolymer (ESI 1) with a nominal styrene content of 69 wt % and melt index of 1 dg/min (according to ASTM D1238, 190° C./2.16 kg), 9 pph isobutane, 0.4 pph glycerol mono stearate, 0.1 pph Irganox 1010 antioxidant (Tetrakis [methylene(3,5-di-

TABLE 5

| | Sound absorption coefficients (SAC) | | | | | Max SAC (0–4000 Hz) | | Average |
|---|---|---|---|---|---|---|---|---|
| Example # | 250 Hz | 500 Hz | 1000 Hz | 2000 Hz | 4000 Hz | SAC max | Frequency[1] | SAC[2] |
| Ex 1 | 0.1 | 0.2 | 0.175 | 0.2 | 0.35 | 0.35 | 4000 | 0.17 |

[1]Frequency corresponding to the maximum sound absorption
[2]Average SAC is the mean SAC of the following frequencies: 250 Hz, 500 Hz, 1000 Hz, and 2000 Hz.

The flame retardancy of the foam is adequate. The acoustics of the smaller cell foam is not as good as that of the larger cell foam of Example 4. Cell size clearly has a big impact on sound absorption performance. Thus, foam formulations should contain low, preferably zero, levels of nucleating agents such as talc (magnesium silicate), calcium stearate, barium stearate, etc.

tert-butyl-4-hydroxyhydrocinnamate)] methane and 1.5 pph carbon black concentrate. The level of the 75/25 polypropylene glycol/ethanol (PPG/EtOH) mixture was varied with all other conditions kept the same and the results are presented in Table 7A. The results show that an increase in the level of the polypropylene glycol/ethanol mixture over the range studied results in an increase in cell size and counteracts some of the nucleating tendencies of the flame retardancy additives.

TABLE 7A

| Example # | PPG/EtOH level[1], pph | Average cell size[2], mm |
| --- | --- | --- |
| Ex 7a | 0.0 | 4.0 |
| Ex 7b | 1.35 | 5.5 |
| Ex 7c | 2.0 | 6.0 |

[1]parts by weight per hundred parts by weight polymer
[2]3-d average cell size measured by ASTM D3576

The following resin formulation comprising polyethylene, polypropylene and ethylene styrene interpolymers was also used: 28/2/70 wt % blend of low density polyethylene (LDPE 1) with a density of 0.925 g/cm$^3$ and melt index of 1.0 dg/min (according to ASTM D1238, 190° C./2.16 kg) and a substantially random ethylene styrene interpolymer (ESI 1) with a nominal styrene content of 69 wt % and melt index of 1 dg/min (according to ASTM D1238, 190° C./2.16 kg) and a polypropylene high melt strength (HMS PP 1) with a melt flow rate of 3 g/10 min (according to ASTM D1238, 230° C./2.16 kg).

The levels of additives used in the formulation are reported in parts by weight per hundred parts by weight of the polymer resin blend (pph). 8 pph isobutane, 0.3 pph glycerol mono stearate, 0.1 pph Irganox 1010 antioxidant (Tetrakis [methylene(3,5-di-tert-butyl-4-hydroxyhydrocinnamate)] methane and 1.5 pph carbon black concentrate. The flame retardant package comprising 3.8 pph tetrabromobisphenol A bis 2,3-dibromopropyl ether (PE™-68) and 1.5 pph TRUTINT™ 50 antimony trioxide. The level of the 75/25 polypropylene glycol/ethanol (PPG/EtOH) mixture was varied with all other conditions kept the same and the results are presented in Table 7B. The results show that an increase in the level of the polypropylene glycol/ethanol mixture over the range studied results in an increase in cell size and counteracts some of the nucleating tendencies of the flame retardancy additives.

TABLE 7B

| Example # | PPG/EtOH level[1], pph | Average cell size[2], mm |
| --- | --- | --- |
| Ex 7d | 0.0 | 4.2 |
| Ex 7e | 2.0 | 6.5 |

[1]parts by weight per hundred parts by weight polymer
[2]3-d average cell size measured by ASTM D3576

The foams of Ex7d and 7e made with the PE-68/Sb$_2$O$_3$ FR package passed the DIN-4102 test with B2 rating.

Example 8

This example describes the formulation and process conditions to make large cell foam with flame retardants and synergists.

Trials were made using equipment and process conditions similar to that used in Example 4. The following resins were used: 85/15 wt % blend of low density polyethylene (LDPE 1) with a density of 0.925 g/cm$^3$ and melt index of 1.0 dg/min (according to ASTM D1238, 190° C./2.16 kg) and a substantially random ethylene styrene interpolymer (ESI 1) with a nominal styrene content of 69 wt % and melt index of 1 dg/min (according to ASTM D1238, 190° C./2.16 kg). The levels of additives used in the formulation are reported in parts by weight per hundred parts by weight of the polymer resin blend (pph). 0.1 pph Irganox antioxidant (Tetrakis [methylene(3,5-di-tert-butyl-4-hydroxyhydrocinnamate)] methane was metered into the extruder. The flame retardants used included brominated agents (PE™-68, (tetrabromobisphenol A bis (2,3-dibromopropyl ether) 30% concentrate in LDPE; and chlorinated agents (Chlorez™700). The inorganic synergist used was antimony trioxide (TMS™, 80% concentrate in LDPE) and the organic synergist used was polycumyl (poly 1,4-diisopropyl benzene). Isobutane at 8.5 pph was injected into the mixing zone and glycerol monostearate at 1.5 pph was melt injected. The first four runs used no color concentrates for a white foam but the last two runs used 3.2 pph of black concentrate for a black foam. The control foam (Comparative Ex 2) used no flame retardant or synergist.

The gel residence time in the extrusion line was 45 min. The gel temperature was the highest in the mixing zone (about 197° C.) and the gel pressure was highest at the gear pump outlet (about 18200 kPa). The hot gel was cooled to the foaming temperature (105° C.). The temperature of the adjustable die (50 mm wide×3.2 mm high) was maintained at 105° C. and the pressure at the die was kept at 1260 kPa. Note the die pressure is approximately 2× the prefoaming critical die pressure.

TABLE 8

| Example # | Flame retardant pph[1] | Synergist pph[1] | Die pressure kPa | Ave. cell size[2] mm | Density[3] kg/m$^3$ |
| --- | --- | --- | --- | --- | --- |
| Comp Ex 2 | None | None | 1260 | 6.0 | 34.0 |
| Ex 8a | PE-68, 3 | Sb$_2$O$_3$, 1 | 1240 | 6.0 | 34.3 |
| Ex 8b | PE-68, 5 | Sb$_2$O$_3$, 1 | 1130 | 6.0 | 34.2 |
| Ex 8c | Chlorez™700, 2.25 | Sb$_2$O$_3$, 2.25 | 1170 | 4.6 | 30.2 |
| Ex 8d | PE-68, 3 | Sb$_2$O$_3$, 1 | 1220 | 6.4 | 34.0 |
| Ex 8e | PE-68, 5.5 | Sb$_2$O$_3$, 0.55 | 1170 | 5.5 | 31.7 |

[1]parts by weight per hundred parts by weight polymer
[2]3-dimensional average cell size measured by ASTM D3576
[3]density measured by ASTM D3575 suffix W method B The foam properties are presented in Table 8. All the flame retardant packages produced moderate to large cell foam of excellent quality, which indicates that the formulations have low nucleating potential. The control foam (Comp Ex 2) failed the DIN-4102 test (B2 rating). The foams of Ex 8 made with the PE-68/Sb$_2$O$_3$ FR package passed the UL-94 test with HBF rating. The foams of Ex 8 made with Chlorez™700/Sb$_2$O$_3$ passed the ASTM E-84 test with Class A rating.

Example 9

This example describes the formulation and process conditions to make large cell foam with a binary blend of brominated and chlorinated flame retardants and a flame retardant synergist.

Trials were made using equipment and process conditions were very similar to that used in Example 4. Low density polyethylene (LDPE 1) with a density of 0.925 g/cm$^3$ and melt index of 1.0 dg/min (according to ASTM D1238, 190° C./2.16 kg) was used. The levels of additives used in the formulation are reported in parts by weight per hundred parts by weight of the polymer resin blend (pph). 0.1 pph Irganox antioxidant (Tetrakis [methylene(3,5-di-tert-butyl-4-hydroxyhydrocinnamate)] methane was metered into the extruder. The flame retardants used included a ternary blend of brominated agent 4.1 pph PE™-68, (tetrabromobisphenol A bis(2,3-dibromopropyl ether) 30% concentrate in LDPE with chlorinated agent 2 pph Chlorez™700 with an inorganic synergist 2 pph antimony trioxide (TMS™ concentrate in LDPE). Isobutane at 9 pph was injected into the mixing zone and glycerol monostearate at 0.2 pph was melt injected. The runs used 1.5 pph of black concentrate for a black foam.

The gel residence time in the extrusion line was 45 min. The gel temperature was the highest in the mixing zone (about 197° C.) and the gel pressure was highest at the gear pump outlet (about 12106 kPa). The hot gel was cooled to the foaming temperature (108° C.). The temperature of the adjustable die (50 mm wide) was maintained at 106° C.

TABLE 9

| Example # | Flame retardant pph[1] | Synergist, pph[1] | Ave. cell size[2], mm | Density[3] kg/m³ |
|---|---|---|---|---|
| Ex 9 | PE-68, 4.1 Chlorez™700, 2 | $Sb_2O_3$, 2 | 6.3 | 33.9 |

[1]parts by weight per hundred parts by weight polymer
[2]3-dimensional average cell size measured by ASTM D3576
[3]density measured by ASTM D3575 suffix W method B The foam properties are presented in Table 9. This flame retardant package produced large cell foam of excellent quality, which indicates that the formulation has low nucleating potential. The foam of Ex 9 made with the PE-68/Chlorez™700/$Sb_2O_3$ FR package passed the UL-94 test with HF-I rating and passed the DIN-4102 test with B2 rating.

Example 10

This example describes the formulation and process conditions to make large cell foam using a blend of polyethylene and polypropylene with flame retardants and synergists.

Trials were made using equipment and process conditions were very similar to that used in Example 4. The following resins were used: 40/60 wt % blend of low density polyethylene (LDPE 1) with a density of 0.925 g/cm³ and melt index of 1.0 dg/min (according to ASTM D1238, 190° C./2.16 kg) and a polypropylene high melt strength (HMS PP 1) with a melt flow rate of 3 g/10 min (according to ASTM D1238, 230° C./2.16 kg). The levels of additives used in the formulation are reported in parts by weight per hundred parts by weight of the polymer resin blend (pph). 0.1 pph Irganox antioxidant (Tetrakis [methylene(3,5-di-tert-butyl-4-hydroxyhydrocinnamate)] methane was metered into the extruder. The flame retardants used included brominated agents (PE™-68, (tetrabromobisphenol A bis(2,3-dibromopropyl ether) 30% concentrate in LDPE; and chlorinated agents (Chlorez™700). The inorganic synergist used was antimony trioxide (TMS™, 80% concentrate in LDPE). Isobutane at 10 pph was injected into the mixing zone. The runs used 1.5 pph of black concentrate for a black foam. The control foam used no flame retardant or synergist.

The gel residence time in the extrusion line was 45 min. The gel temperature was the highest in the mixing zone (about 225° C.) and the gel pressure was highest at the gear pump outlet (about 21474 kPa). The hot gel was cooled to the foaming temperature (155° C.). The temperature of the adjustable die (50 mm wide) was maintained at 152° C.

TABLE 10

| Example # | Flame retardant pph[1] | Synergist pph[1] | Ave. cell size[2], mm | Density[3] kg/m³ |
|---|---|---|---|---|
| Comp | None | None | 9.0 | 27.5 |
| Ex 10a | PE-68, 3 | $Sb_2O_3$, 1 | 6.5 | 31.0 |
| Ex 10b | PE-68, 5 Chlorez™700, 1.5 | $Sb_2O_3$, 1.5 | 3.6 | 28.7 |

TABLE 10-continued

| Example # | Flame retardant pph[1] | Synergist pph[1] | Ave. cell size[2], mm | Density[3] kg/m³ |
|---|---|---|---|---|
| Ex 10c | PE-68, 3 Chlorez™700, 1 | $Sb_2O_3$, 1 | 3.6 | 28.7 |

[1]parts by weight per hundred parts by weight polymer
[2]3-dimensional average cell size measured by ASTM D3576
[3]density measured by ASTM D3575 suffix W method B The foam properties are presented in Table 10. All the flame retardant packages produced moderate to large cell foam of excellent quality, which indicates that the formulations have low nucleating potential. The control foam (Comp) failed the DIN-4102 test (B2 rating) and failed UL-94 test. The foams of Ex 10 made with the PE-68/$Sb_2O_3$ FR package passed the DIN-4102 test with B2 rating and passed UL-94 test with BF-1 rating. The foams of Ex 10 made with PE-68/Chlorez™700/$Sb_2O_3$ passed the DIN-4102 test with B2 rating and passed UL-94 test with HF-1 rating.

Example 11

Example 11 illustrates the effect of nucleating agents on cell size. This example also compares the foam properties obtained with flame retardant packages comprising inorganic and organic synergists.

The formulation and process conditions were very similar to that used in the earlier section. The ESI 1 resin is typically dusted with talc to prevent blocking (agglomeration of pellets). Batch to batch variations exist in the talc level of the dusted resin. Nucleating agents like talc (magnesium silicate), calcium stearate, barium stearate, etc., increase the number of nuclei that are created during foaming and produce small cells. The cell size decreases as the level of nucleator increases until a critical level, beyond which no effect is observed.

The foam properties are presented in Table 11. The flame retardant package comprising 3 pph tetrabromobisphenol A bis 2,3-dibromopropyl ether (PE™-68) and 1 pph TRUTINT™ 50 antimony trioxide at the same ratio (3:1) as used in the earlier section produced small cell foam (<3 mm) that is acoustically inactive. A higher level of dusted talc in the formulation is responsible for this cell size reduction. The flame retardant package comprising 3.5 pph of SAYTEX™ HP-900 hexabromocyclododecane (HBCD) with 0.3 pph of poly 1,4-diisoproplbenzene (polycumyl) was added to the formulation. A foam with moderate cell size was obtained (>3 mm). Synergists with a low level of insoluble particles are preferred for making large cell acoustic foam because of their lower nucleation tendency. The flame retardant package also comprising 4.6 pph tetrabromobisphenol A bis 2,3-dibromopropyl ether (PE™-68) and 1.9 pph TRUTINT™ 50 antimony trioxide with increasing percentage of ESI.

For a fixed flame retardant composition (4.6 pph tetrabromobisphenol A bis 2,3-dibromopropyl ether (PE™-68) and 1.9 pph TRUTINT™ 50 antimony trioxide), the level of ESI (and hence, the level of talc) in the formulation was varied and the results are presented in Table 11. The results show that an increase in the level of ESI in the blend caused a reduction in the cell size due to the nucleation caused by the dusted talc. However, no negative effect on flame retardancy was observed in the range studied as all foams passed the DIN 4102 fire test with B2 rating.

TABLE 11

| Example # | Ratio LDPE/ESI | Flame retardant, pph[1] | Synergist, pph[1] | Average cell size[2], mm |
|---|---|---|---|---|
| Ex 11a | 85/15 | PE-68, 3 | $Sb_2O_3$, 1 | 2.7 |
| Ex 11b | 85/15 | SAYTEX™HP-900, 3.5 | Poly-cumyl, 0.3 | 4.0 |
| Ex 11c | 100/0 | PE-68, 4.6 | $Sb_2O_3$, 1.9 | 6.9 |
| Ex 11d | 95/5 | PE-68, 4.6 | $Sb_2O_3$, 1.9 | 4.4 |
| Ex 11e | 90/10 | PE-68, 4.6 | $Sb_2O_3$, 1.9 | 2.5 |

[1]parts by weight per hundred parts by weight polymer
[2]3-d average cell size measured by ASTM D3576
The flame retardant foam passed the DIN 4102 fire test with B2 rating.

Example 12

This example describes the formulation and the process conditions to make large cell acoustic foam with flame retardants and synergists. The foams were prepared in commercial extrusion equipment. The large scale single screw extruder consisted of a feeding zone for solid additives and resins, a melting zone and a metering zone. In addition, there was a mixing zone with a port to inject the blowing agent and liquid additives, a cooling zone to uniformly cool the melt to the foaming temperature and a die body. A gear pump between the metering and mixing zones stabilized the melt flow rate. A static mixer in the cooling zone aided in gel temperature uniformity. The foaming temperature is the optimal gel temperature for foaming when the melt strength is high enough to stabilize the foam and prevent cell collapse. The melt is extruded through a die to room temperature and pressure to expand the gel and stabilize the resulting foam.

The levels of additives used in the formulation are reported in parts by weight per hundred parts by weight of the polymer resin blend (pph). For Comparative Example 3, low density polyethylene (LDPE 2) with a density of 0.924 g/cc and melt index of 1.8 dg/min (according to ASTM D1238, 190° C./2.16 kg) was fed along with 0.3 pph Irganox antioxidant (Tetrakis [methylene(3,5-di-tert-butyl-4-hydroxyhydrocinnamate)] methane and 1.5 pph of black concentrate (25% carbon black in the same LDPE resin). Isobutane at 8.5 pph was injected into the mixing zone and glycerol monostearate at 1.5 pph was melt injected. For the flame retardant run, the compounded FR package was dosed at 3.5 pph Chlorez™ 760 and 3.5 pph antimony trioxide.

The gel residence time in the extrusion line was 45 min. The gel temperature was the highest in the mixing zone (192° C.) and the gel pressure was highest at the gear pump outlet (8800 kPa). The hot gel was cooled to the foaming temperature (112.5° C.). The temperature of the fixed, variable cross-section die was maintained at 112.5° C. The die body was not equipped with a pressure transducer for determining the die pressure.

Knowing the die geometry's, the die pressure in the large scale extruder can be estimated from the die pressure in the pilot scale extruder by the following procedure. The procedure assumes that the viscosity of the polymer melt, the gel foaming temperature and the formulation are the same for both lines.

The shear rates for the non-Newtonian fluid ($\gamma°$) in the two lines are therefore the same and given by the Rabinowitsch equation:

$$\gamma° = \{(2n+1)/3n\} * 6Q/(w*h*h)$$

where n is the power law index ($\tau = \gamma°^n$), Q is the flow rate and w and h are the width and height of the die.

For the pilot line, the flow rate was 60 kg/hr=132 lb./hr. The die pressure was determined at two die slit settings.

When the slit die dimensions were 50 mm width (1.97") and 3.3 mm (0.13") height, the die pressure was 1390 kPa (2× prefoaming critical die pressure) and shear rate calculated from the above equation (for n=1) is 215 sec$^{-1}$.

When the slit die dimensions were 50 mm width (1.97") and 0.85 mm (0.133") height, the die pressure was 3130 kPa (4.5× prefoaming critical die pressure) and shear rate calculated from the above equation (for n=1) is 3341 sec$^{-1}$.

For the large line, the flow rate was 1180 kg/hr=2600 lb./hr. The cross-section of the die is non-uniform and a representative gap needs to be determined. This was done by dividing the die into sections from the center of the die to the ends and by calculating the incremental and cumulative areas for each section. The cumulative area was then plotted against the section distance from the center of the die, resulting in a very non-linear curve. Different average gaps were assumed and the cumulative area was then plotted against the section distance from the centerline resulting in a linear curve with different slopes. The best fit line was obtained with the average gap which corresponded to the cumulative area of the section at ⅔ the full width divided by the section distance from the center of the die. For the large die, the average gap as calculated as 3.22 mm and the effective width of the die was 332 mm. The shear rate calculated from the above equation was 670 sec$^{-1}$. The die pressure of the large line was estimated at 2.4× the prefoaming critical die pressure.

For Comparative Example 3 made with no flame retardant package, the cell size was 7 mm and the fresh density was 30.4 kg/m$^3$. For Example 11 made with the flame retardant package, the cell size was 4 mm (horizontal)×12 mm (vertical) and the fresh density was 30.4 kg/m$^3$.

The foam of Comparative Example 3 failed the DIN-4102 fire test and the UL-94 fire test. The flame retardant foam of Example 12 passed the DIN-4102 fire test with B2 fire rating and passed the UL-94 fire test with HF1 rating. The foams of Example 12 and Comparative Example 3 both with no skin, no perforations and 35 mm thickness were tested for acoustic performance using ASTM E-1050 (Impedance Tube Method). The acoustic results are comparable as summarized in Table 12.

TABLE 12

| | Sound absorption coefficients (SAC) | | | | | Max SAC (0–4000 Hz) | | Average |
|---|---|---|---|---|---|---|---|---|
| Example # | 250 Hz | 500 Hz | 1000 Hz | 2000 Hz | 4000 Hz | SAC max | Frequency[1] | SAC[2] |
| Comp Ex 3 | 0.09 | 0.52 | 0.56 | 0.54 | 0.46 | 0.76 | 630 | 0.43 |
| Ex 12 | 0.11 | 0.52 | 0.41 | 0.45 | 0.5 | 0.63 | 630 | 0.37 |

[1]Frequency corresponding to the maximum sound absorption
[2]Average SAC is the mean SAC of the following frequencies: 250 Hz, 500 Hz, 1000 Hz, and 2000 Hz, Example 13

This example describes the formulation and the process conditions to make large cell acoustic foam made with a different flame retardant/synergist package.

Runs were made in commercial extrusion equipment on a different large line. For the flame retardant foam run, a 97/3 blend of low density polyethylene (LDPE 2) with a density of 0.924 g/cm$^3$ and melt index of 1.8 dg/min (according to ASTM D1238, 190° C./2.16 kg) and ethylene styrene interpolymer (ESI 1) with a nominal styrene content of 69% and melt index of 1 dg/min (according to ASTM D1238, 190° C./2.16 kg) was fed. 0.5 pph Irganox antioxidant (Tetrakis [methylene(3,5-di-tert-butyl-4-hydroxyhydrocinnamate)] methane and 2 pph of black concentrate (25% carbon black in LDPE 2) were also fed to the extruder. Isobutane at 9 pph was injected into the mixing zone and glycerol mono stearate at 0.75 pph was melt injected. The first flame retardant formulation (FRI) comprised 5 pph of PE-68 (tetrabromobisphenol A bis (2,3-dibromopropyl ether) 30% concentrate in LDPE) and 1.5 pph of antimony trioxide (Trutint™ 50, 3 micron particle size, 80% concentrate in LDPE). The second flame retardant formulation (FR2) comprised 4 pph of PE-68 (tetrabromobisphenol A bis (2,3-dibromopropyl ether) 30% concentrate in LDPE) and 2 pph of antimony trioxide (Trutint™ 50, 80% concentrate in LDPE).

The gel residence time in the extrusion line was 45 min. The gel temperature was the highest in the mixing zone (190° C.). The hot gel was cooled to the foaming temperature (112.5° C.). The temperature of the fixed, variable cross-section die was maintained at 112.5° C. The die body was not equipped with a pressure transducer for determining the die pressure.

For the large line, the flow rate was 680 kg/hr=1500 lb./hr. For the large die, the average gap was calculated as 3.22 mm and the effective width of the die was 332 mm. The shear rate was obtained as 386 sect when calculated using the procedure detailed in the earlier section. The die pressure of the large line was estimated at 2.1× the prefoaming critical die pressure.

Large cell foam with cell size of 6 mm (horizontal)×6 mm (extrusion)×8 m (vertical) was obtained. The first flame retardant formulation passed the UL-94 fire test with HBF rating and passed the DIN-4102 fire test with B2 fire rating. The second flame retardant formulation passed only the UL-94 fire test with HBF rating. The flame retardant foams were tested using ASTM E-1050 (Impedance Tube Method). The foams were tested without skins, unperforated and 35 nun in thickness. The acoustic results are summarized in Table 13.

TABLE 13

| Example # | Flame Retardant Package | Sound absorption coefficients (SAC) | | | | | Max SAC (0–4000 Hz) | | Average |
|---|---|---|---|---|---|---|---|---|---|
| | | 250 Hz | 500 Hz | 1000 Hz | 2000 Hz | 4000 Hz | SAC max | Frequency[1] | SAC[2] |
| Ex 13a | FR1 | 0.076 | 0.311 | 0.933 | 0.657 | 0.768 | 0.933 | 1000 | 0.49 |
| Ex 13b | FR2 | 0.070 | 0.247 | 0.924 | 0.662 | 0.789 | 0.924 | 1000 | 0.48 |

[1]Frequency corresponding to the maximum sound absorption
[2]Average SAC is the mean SAC of the following frequencies: 250 Hz, 500 Hz, 1000 Hz, and 2000 Hz,

We claim:

1. A macrocellular acoustic foam obtainable by subjecting a foamable gel comprising at least one blowing agent and at least one polymeric resin composition to an extrusion process, wherein said polymeric resin composition comprises A) one or more homopolymers of ethylene, one or more $C_3$–$C_{20}$ α-olefin polymer, or a combination thereof;

B) one or more haloganated flame retardants;

C) optionally, one or more polymers other than that of Component A; and

D) optionally, one or more flame retardant synergists, wherein component A does not include substantially random interpolymers comprising polymer units derived from one or more α-olefin monomers with one or more vinyl or vinylidene aromatic monomers and/or hindered aliphatic or cycloaliphatic vinyl or vinylidene monomers and the extrusion process is conducted at a die pressure greater than the prefoaming critical die pressure but less than or equal to four times that of said prefoaming critical die pressure.

2. A macrocellular acoustic foam comprising;

A) one or more homopolymers of ethylene, one or more $C_3$–$C_{20}$ α-olefin polymers, or a combination thereof;

B) one or more halogenated flame retardants;

C) optionally, one or more polymers other than that of Component A; and

D) optionally, one or more flame retardant synergists wherein component A does not include substantially random interpolymers comprising polymer units derived from one or more α-olefin monomers with one or more vinyl or vinylidene aromatic monomers and/or hindered aliphatic or cycloaliphatic vinyl or vinylidene monomers.

3. The macrocellular acoustic foam of claim 2; wherein
A) Component A is one or more homopolymers of ethylene, or one or more $C_3$–$C_{10}$ α-olefin polymers, or a combination thereof;
B) said halogenated flame retardant, Component B comprises one or more of hexahalodiphenyl ethers, octahalodiphenyl ethers, decahalodiphenyl ethers, decahalobiphenyl ethanes, 1,2-bis(trihalophenoxy) ethanes, 1,2-bis(pentahalophenoxy) ethanes, hexahalocyclododecane, a tetrahalobisphenol-A, ethylene(N,N')-bis-tetrahalophthalimides, tetrabromobisphenol A bis(2,3-dibromopropyl ether), tetrahalophthalic anhydrides, hexahalobenzenes, halogenated indanes, halogenated phosphate esters, halogenated paraffins, halogenated polystyrenes, polymers of halogenated bisphenol-A and epichlorohydrin, or a combination thereof;
C) Component C, when present, comprises one or more of; a heterogeneous ethylene/α-olefin interpolymer, a homogeneous ethylene/α-olefin interpolymer, a thermoplastic olefin, a styrenic block copolymer, a styrenic homopolymer or copolymer, an elastomer, a thermoplastic polymer, a thermoset polymer; a vinyl or vinylidene halide homopolymer or copolymer, an engineering thermoplastics, or a combination thereof; and
D) Component D is present and comprises one or more metal oxides, boron compounds, and organic peroxide compounds, or a combination thereof.

4. The macrocellular acoustic foam of claim 2; wherein
A) Component A is a homopolymer of ethylene, or a propylene polymer, or a combination thereof;
B) said halogenated flame retardant, Component B comprises hexabromocyclododecane (HBCD), tetrabromobisphenol A bis(2,3-dibromopropyl ether), or a combination thereof;
C) Component C, when present, comprises a heterogeneous ethylene/α-olefin interpolymer, a homogeneous ethylene/α-olefin interpolymer, or a combination thereof; and
D) said flame retardant synergist, Component D, is present and comprises one or more iron oxide, tin oxide, zinc oxide, aluminum trioxide, alumina, antimony trioxide, antimony pentoxide, bismuth oxide, molybdenum trioxide, and tungsten trioxide, zinc borate, antimony silicates, zinc stannate, zinc hydroxystannate, ferrocene, dicumyl peroxide, and polycumyl peroxide, or a combination thereof.

5. The macrocellular acoustic foam of claim 4; wherein
A) Component A is LDPE or polypropylene, or a combination thereof;
B) Component B is hexabromocyclododecane (HBCD), tetrabromobisphenol A bis(2,3-dibromopropyl ether), or a combination thereof;
C) Component C, when present, is a substantially linear ethylene/1-octene copolymer; and
D) Component D is present as antimony trioxide.

6. The macrocellular acoustic foam of claim 2 having a halogen content in the range from 0.1 to 15 weight-percent.

7. The macrocellular acoustic foam of claim 2 in the form of an office partition, automotive decoupler, domestic appliance sound insulation, sound proofing panel or machine enclosure.

8. The macrocellular acoustic foam of claim 2 having an average cell size according to ASTM D3576 in the range from 3 mm to 15 mm.

9. The macrocellular acoustic foam of claim 2 having an average cell size according to ASTM D3576 in the range from 4 mm to 15 mm.

10. The macrocellular acoustic foam of claim 2, wherein Component A is a homopolymer of ethylene, or a propylene polymer, or a combination thereof.

11. The macrocellular acoustic foam of claim 2, wherein Component A comprises a propylene polymer.

12. The macrocellular acoustic foam of claim 11, wherein the propylene polymer has a tan δ not greater than 1.5.

13. The macrocellular acoustic foam of claim 11 having an average cell size according to ASTM D3576 in the range from 4 mm to 15 mm.

14. The macrocellular acoustic foam of claim 13 having a halogen content in the range from 0.1 to 15 weight-percent.

15. The macrocellular acoustic foam of claim 2, wherein component C is present and the polymer blend component having the highest melting point is present in an amount greater than 40 weight-percent in the blend.

16. The macrocellular acoustic foam of claim 2, wherein component A is the majority component of a blend with component C.

17. The macrocellular acoustic foam of claim 2, wherein component C is absent.

18. The macrocellular acoustic foam of claim 11, wherein component C is absent.

19. The macrocellular acoustic foam of claim 14, wherein component C is absent.

* * * * *